United States Patent
Vakharia et al.

(10) Patent No.: US 9,619,118 B2
(45) Date of Patent: Apr. 11, 2017

(54) WHEEL-BASED INTERFACE FOR BROWSING APPLICATIONS

(71) Applicant: Quixey, Inc, Mountain View, CA (US)

(72) Inventors: Paresh Vakharia, Santa Clara, CA (US); Cheng-Ruei Fan, Mountain View, CA (US)

(73) Assignee: Quixey, Inc, Mountain View, CA (US)

( * ) Notice: Subject to any disclaimer, the term of this patent is extended or adjusted under 35 U.S.C. 154(b) by 676 days.

(21) Appl. No.: 14/098,535

(22) Filed: Dec. 6, 2013

(65) Prior Publication Data
US 2015/0160807 A1 Jun. 11, 2015

(51) Int. Cl.
*G06F 3/048* (2013.01)
*G06F 3/0484* (2013.01)
*G06Q 30/06* (2012.01)

(52) U.S. Cl.
CPC ....... *G06F 3/0484* (2013.01); *G06Q 30/0627* (2013.01)

(58) Field of Classification Search
CPC .............. G06F 17/30991; G06F 3/04842
USPC ............................................. 715/834
See application file for complete search history.

(56) References Cited

U.S. PATENT DOCUMENTS

| | | | | |
|---|---|---|---|---|
| 7,036,090 | B1 * | 4/2006 | Nguyen | G06F 3/0482 348/E5.002 |
| 2009/0282368 | A1 * | 11/2009 | Lam | G06F 17/30991 715/834 |
| 2010/0131881 | A1 * | 5/2010 | Ganesh | G06F 17/30994 715/769 |
| 2010/0281374 | A1 * | 11/2010 | Schulz | G06F 3/0482 715/723 |
| 2013/0246974 | A1 * | 9/2013 | Weisberg | G06F 3/04842 715/834 |

OTHER PUBLICATIONS

"Mercury Browser," iLegendSoft, 2010-2011, 6 pages, [Online] [Retrieved on Apr. 21, 2014] Retrieved from the Internet<URL:http://www.ilegendsoft.com/software/mercurybrowser/>.
"TaskRabbit Shopping & Delivery," Oct. 16, 2013, 1 page.
"TaskRabbit Virtual Tasks," Oct. 16, 2013, 1 page.
"Cleaning Task," Oct. 16, 2013, 1 page.

* cited by examiner

*Primary Examiner* — Andrey Belousov
(74) *Attorney, Agent, or Firm* — Harness, Dickey & Pierce, P.L.C.

(57) ABSTRACT

A wheel-based user interface provides navigation between categories and subcategories of applications. A first browse wheel contains a plurality of category regions, each corresponding to an application category. In response to a user selection of an application category received at the first browse wheel, a second browse wheel is displayed. The second browse wheel contains a plurality of subcategory regions, each corresponding to an application subcategory within the selected application category. In response to a user selection of an application subcategory received at the second browse wheel, an application search query is generated using the selected category and subcategory.

24 Claims, 20 Drawing Sheets

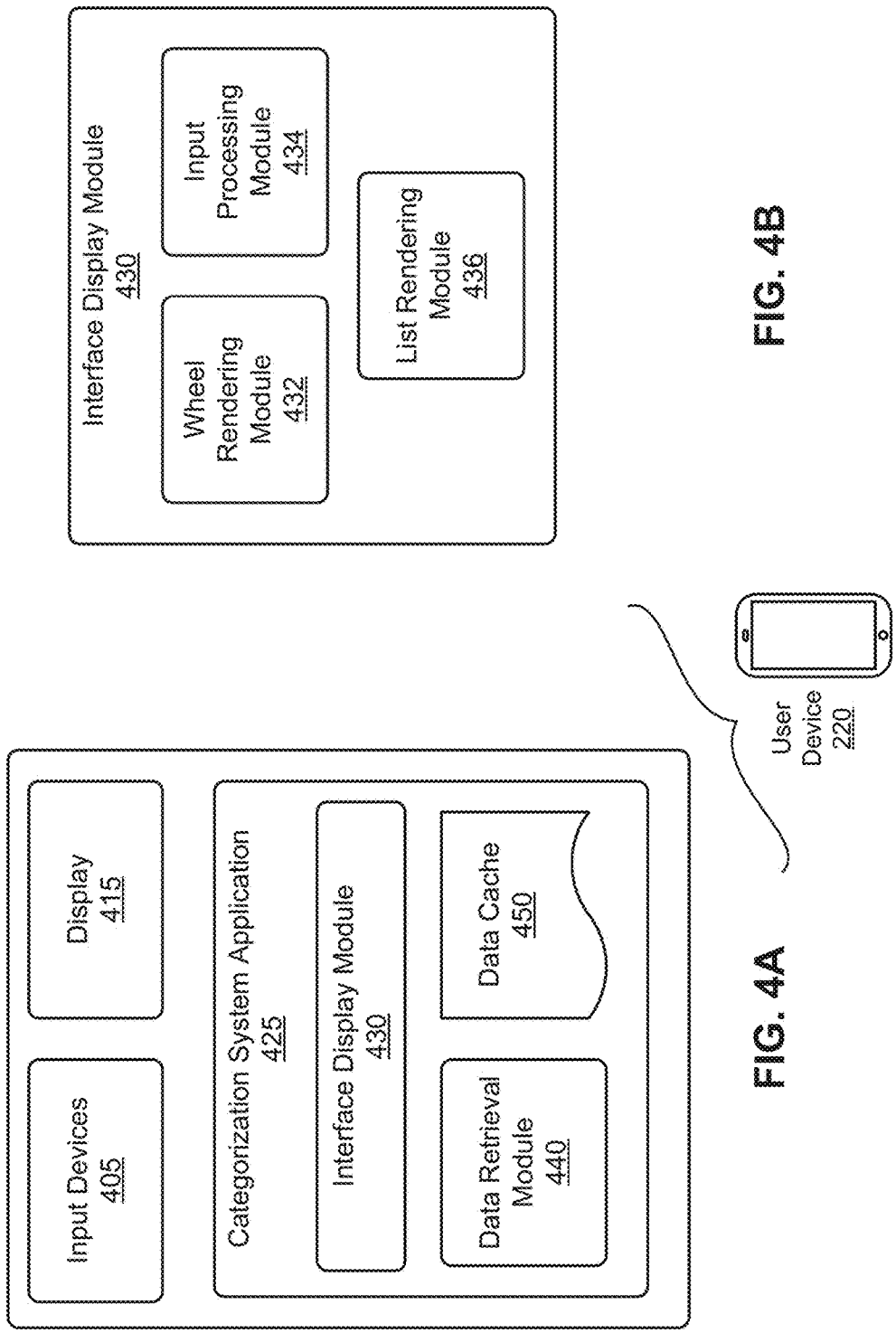

WHEEL-BASED INTERFACE FOR BROWSING APPLICATIONS

BACKGROUND

Field of Art

The disclosure generally relates to user interfaces, and more particularly to user interfaces for browsing for applications.

Description of the Related Art

In recent years, use of computers, smartphones, and other Internet-connected devices has grown exponentially. Correspondingly, the number of available applications for such devices has also grown. Today, many diverse applications can be accessed on any number of different devices, including, but not limited to, smartphones, tablet computers, personal computers, refrigerators, automobiles, and televisions. These diverse applications can include business driven applications, games, educational applications, news applications, shopping applications, efficiency applications, messaging applications, video chatting applications, media streaming applications, social networking applications, and others.

As the number and diversity of applications grows, it becomes increasingly difficult for users to browse for applications that may be of interest to them. Although some developments in search technology have made it easier to search for applications, it remains challenging for users to find applications by browsing.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

FIG. 4A is an example high-level block diagram illustrating components of a user device.

FIG. 4B is an example high-level block diagram illustrating a detailed view of modules within an interface display module.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed. It is noted that wherever practicable similar or like reference numbers may be used in the figures and may indicate similar or like functionality.

Configuration Overview

One embodiment of a disclosed system, method, and computer readable storage medium provides a wheel-based user interface that allows a user to easily navigate between different categories and subcategories of applications. When a category and subcategory are selected by the user, a search is requested for applications related to the selected category and subcategory. In one embodiment, the search includes a search query. In one embodiment, the wheel-based user interface contains three main interfaces. The first interface presents a category browse wheel with labels for top-level application categories to the user, and the user can interact with the category browse wheel to select one of the corresponding top-level categories. After a user selects a category, a second interface is displayed that includes a subcategory browse wheel with labels for subcategories of the selected category. The user can similarly interact with the subcategory browse wheel to select one of the subcategories. After the user selects a subcategory, a third interface is displayed showing a list of applications in the selected subcategory. The third interface also includes a portion of the subcategory browse wheel, and the user can interact with the browse wheel portion to view applications in a different subcategory without returning to the second interface.

Figure 1A:
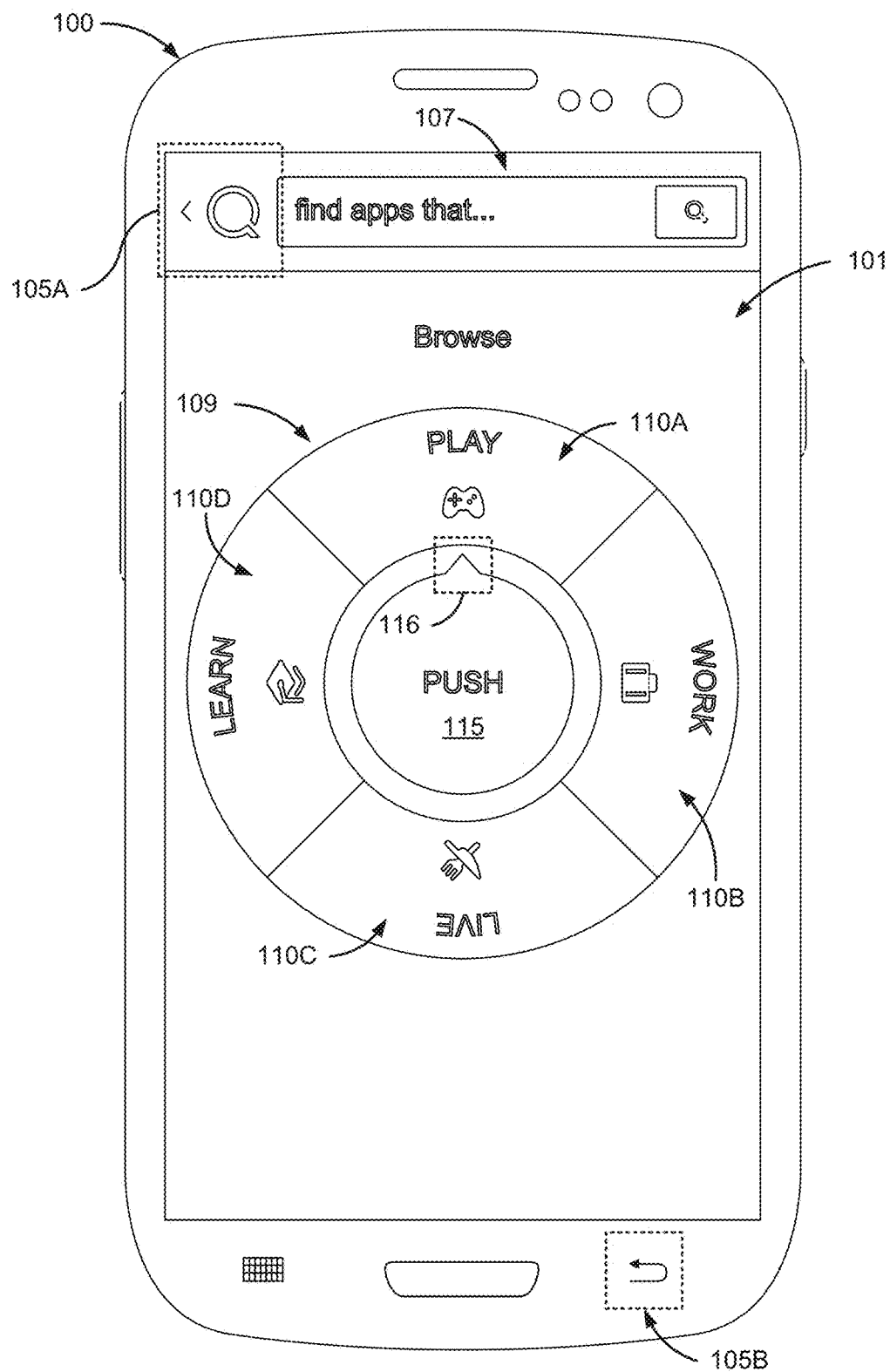
FIGS. 1A-1C show a mobile device with example screenshots of a wheel-based interface for browsing applications.

A screenshot of an example of the first interface 101, displayed by a user device 100, is shown in FIG. 1A. In the example of FIG. 1A, four top-level application categories are shown corresponding to four category regions 110. More or fewer category regions 110 and corresponding top-level application categories may be shown in various embodiments. The first interface 101 includes a category browse wheel 109 with four category regions 110A through 110D that represent four top-level application categories. The category browse wheel 109 also includes a circular selection region 115 positioned concentric to the category browse wheel 109. In some implementations, the selection region 115 is circumscribed by the category regions 110 such that the category regions 110 surround the selection region 115. The selection region 115 includes an identifier graphic 116 that identifies one of the category regions 110A through 110D. For example, the identifier graphic 116 indicates (e.g., points out) a category region which may be selected when the selection region 115 receives a user gesture (e.g., a tapping gesture). In the screenshot shown in FIG. 1A, the identifier graphic 116 is a pointer at the edge of the selection region 115 that points in an upward direction, and the vertex of the identifier graphic 116 identifies the category region 110A at the top of the browse wheel 109. While the selection region 115 and the identifier graphic 116 are shown interior to the category regions 110, in other embodiments these may be located exterior to the category regions 110.

The user can perform one of several different interactions with the category browse wheel 109 to select the application category corresponding to one of the category regions 110A through 110D. In one interaction, the user taps inside the user's preferred category region 110 to select the corresponding application category. For example, the user performing a tapping gesture at a position inside the "play" category region 110A selects the "play" application category. In another interaction with the category browse wheel 109, the user performs one or more swiping gestures (e.g., arc-shaped swiping gestures) on the browse wheel 109 to rotate the browse wheel 109 until the user's preferred category region is in the position identified by the identifier graphic 116. After the preferred category region is rotated into the identified position, the user performs a tapping gesture on the selection region 115 to select the corresponding application category. In a scenario where the user's preferred category region is already in the position identified by the identifier graphic 116, the user can perform a tapping gesture on the selection region 115 to select the preferred category region without first rotating the browse wheel 109. In the screenshot shown in FIG. 1A, the user can select the "play" category by tapping the selection region 115 because the "play" category region 110A is in the position identified by the identifier graphic 116. In one embodiment, rotating a desired category region 110 into alignment with the identifier graphic 116 may automatically select the category region. In another embodiment, a category region is not selected until a user taps the selection region 115.

Figure 1B:
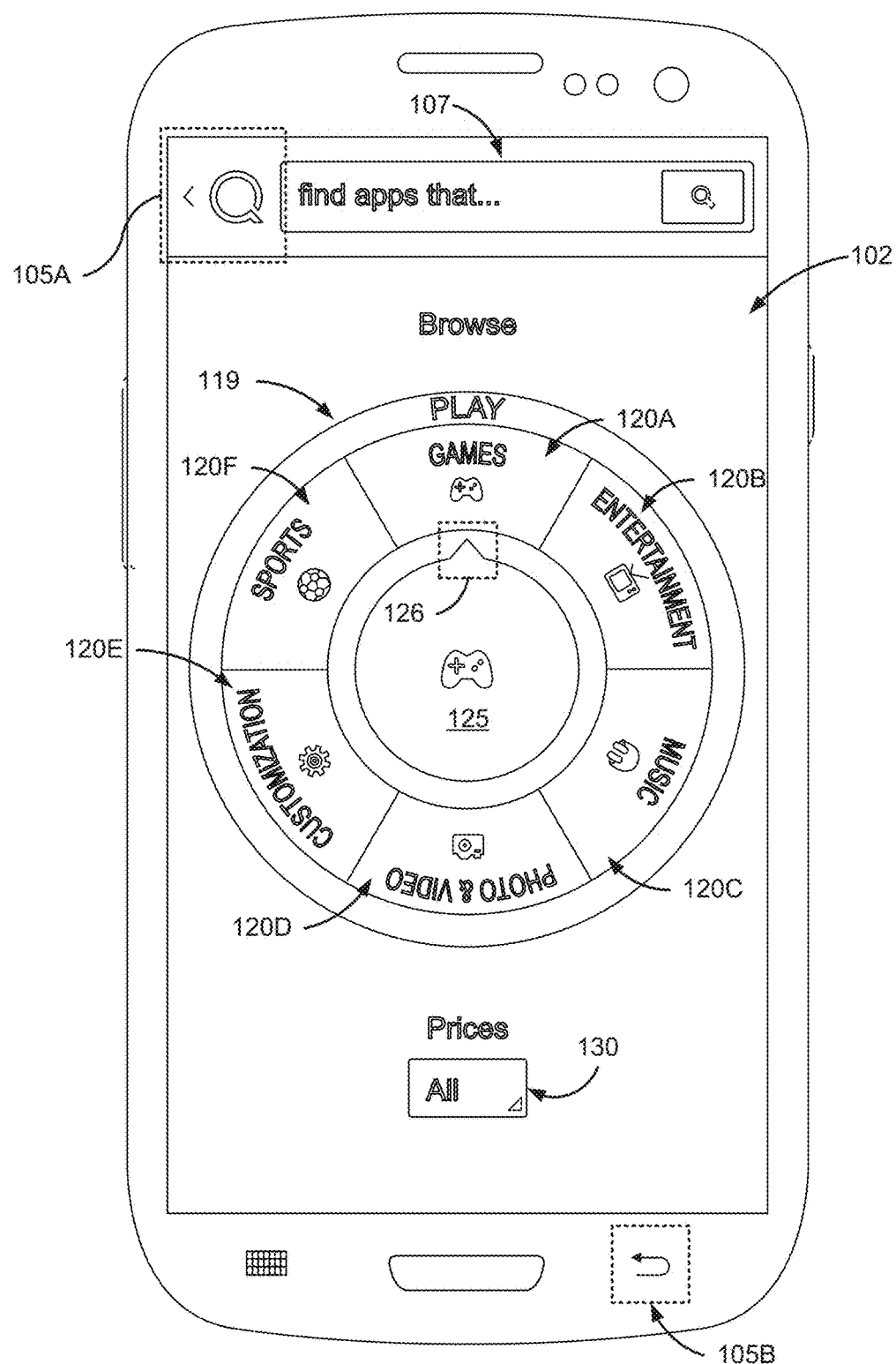

In response to the user's selection of a category region 110, a second interface is displayed. FIG. 1B illustrates an example screenshot of the second interface 102, which is displayed after a selection of a category is received on the first interface 101. Similar to the first interface 101, the second interface 102 also includes a browse wheel 119 and a selection region 125 that behave in a manner similar to the corresponding elements 109, 115 in the first interface 101. That is, the browse wheel 119 rotates responsive to a swipe motion and the selection region 125 is used for selecting an item in the browse wheel. The subcategory browse wheel 119 of the second interface 102 in this example contains six subcategory regions 120A through 120F, and each subcategory region 120A through 120F represents a subcategory of the selected category. Thus, the user can perform the same interactions with the browse wheel 119 and the selection region 125 to select one of the application subcategories represented by the subcategory regions 120A through 120F on the browse wheel 119. In the illustrated example, the "play" category was selected on the first interface portion 101, so the subcategories of the "play" category are shown in the subcategory regions 120A through 120F on the browse wheel 119.

As shown in FIG. 1B, the second interface 102 also includes a price selection element 130. In one embodiment, the price selection element 130 is a menu listing various price ranges for applications. Users can specify a desired price range for applications by selecting a price range from the price selection element 130.

The user interacts with the subcategory browse wheel 119 to select one of the subcategory regions 120. For example, the user may perform a tapping gesture at a position inside one of the subcategory regions 120 to select the subcategory. Alternatively, the user may swipe a subcategory region 120 until it is aligned with the identifier graphic 126, and tap the selection region 125 to select the subcategory corresponding to the subcategory region 120. In response to the user's selection of a subcategory region 120, an application search query is generated using the selected category and subcategory. The application search query is used to retrieve a list of applications within the selected category and subcategory, which is displayed to the user in a third interface.

Figure 1C:
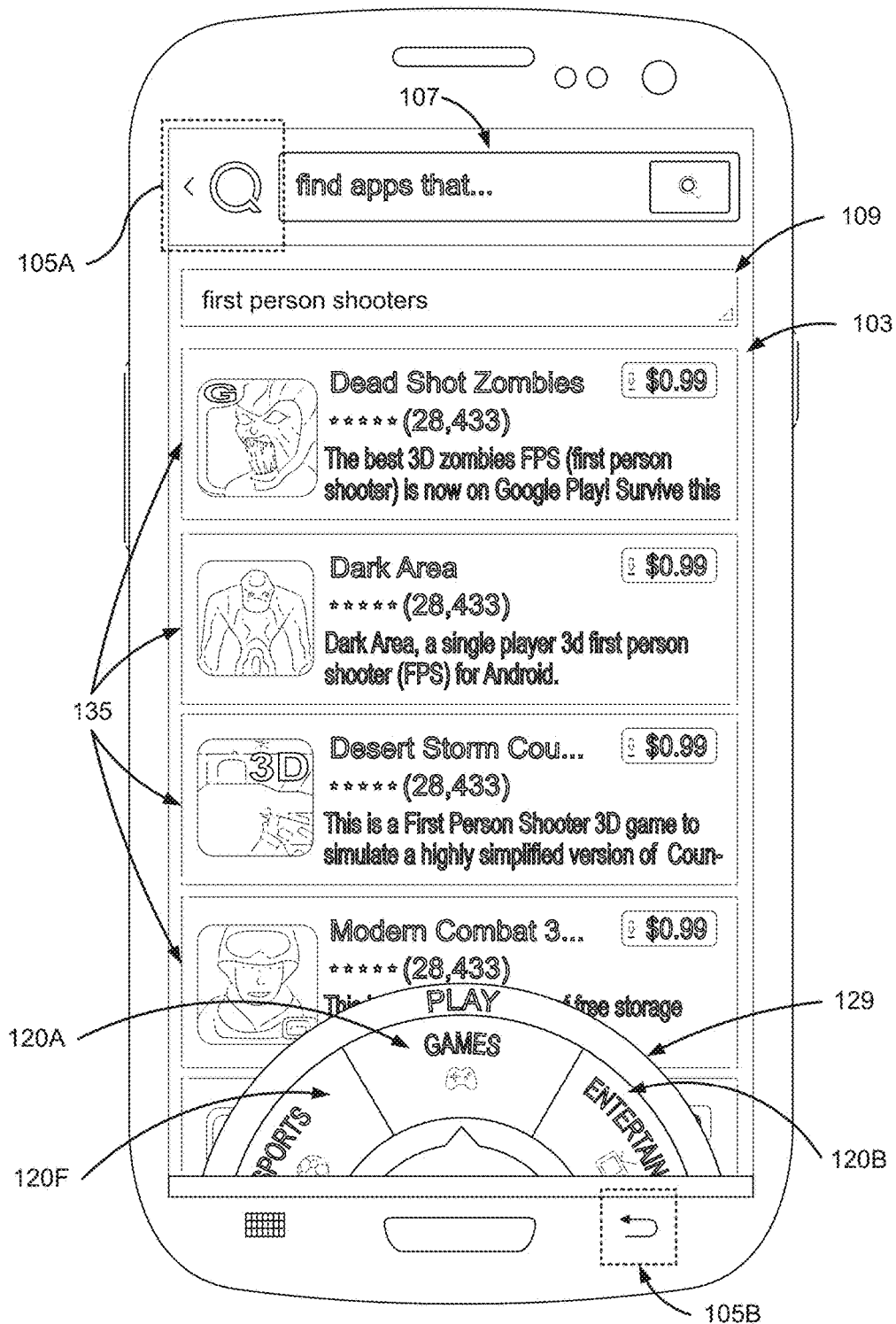

FIG. 1C illustrates an example screenshot of the third interface 103, which is displayed after a selection of the application subcategory is received via the second interface 102. The third interface 103 includes a list of applications 135 in the selected subcategory, which is provided based on the application search query. As described below, the application search query is executed in one embodiment by a categorization system. After the third interface 103 is displayed, the user can select any application shown in the list 135 or scroll down in the list 135 to see additional applications. In the illustrated example, the "games" subcategory of the "play" category was selected on the second interface 102, so the list of applications 135 is a result of a search query executed based on the games subcategory and the play category.

The third interface 103 also includes a portion 129 of the subcategory browse wheel 119 that was shown in its entirety in the second interface 102. The portion 129 of the subcategory browse wheel that is shown includes the subcategory region 120A representing the selected subcategory, which allows the user to see the subcategory for the applications currently displayed in the list 135 and, if desired, to select a different subcategory. The browse wheel portion 129 also includes adjacent subcategory regions 120B, 120F representing other subcategories in the application category, and the user can perform left and right swiping gestures on the partial browse wheel 129 to view application lists for the other subcategories. In the example shown in FIG. 1C, the user can swipe right on the partial browse wheel 129 to view an application list for the sports subcategory, or the user can swipe left to view an application list for the entertainment subcategory. When the user swipes to select another subcategory, another application search query is generated to search for applications in the other subcategory. The applications displayed in the list 135 are updated to display the results of the application search query for the newly-selected search query.

In addition to the elements described above, the three interfaces 101, 102, 103 may further include a back button 105A that allows the user to navigate to a previous interface. For example, selecting the back button 105A on the third interface 103 (e.g., the example screenshot shown in FIG. 1C) triggers a transition to the second interface 102. As another example, selecting the back button 105A on the second interface 102 (e.g., the example screenshot shown in FIG. 1B) triggers a transition to the first interface 101. In some embodiments, selecting the back button 105A on the first interface 101 (e.g., the example screenshot shown in FIG. 1A) triggers a transition to a different interface not shown in FIGS. 1A-1C. For example, in embodiments where the wheel-based interface is included as a feature in an application that performs a functional application search, selecting one of the back buttons triggers a transition to an interface portion with a search box in the center of the interface. In some embodiments, a dedicated back button 105B of the user device 100 that is outside of the interfaces 101, 102, 103 performs similar functions as the back button 105A in the three interfaces 101, 102, 103. In these embodiments, the back button 105A may be omitted from the interface portions 101, 102, 103 to simplify the on-screen appearance of the interfaces 101, 102, 103.

In one embodiment, the three interfaces 101, 102, 103 include a search bar 107 and/or a query menu 109 configured to receive a query string from a user. By entering a query string into the search bar 107, the user can refine the list of applications presented in the third interface 103. Additionally or alternatively, a user may select a predefined query string from the query menu 109. For example, the query menu 109 may include a small number (e.g., five) of the most commonly received query strings in a given category. If a user enters a query string into the search bar 107 or selects a predefined query string from the query menu 109, an application search query is generated that includes the query string as well as the category and subcategory selected by the user via interactions with the browse wheels. In this case, the list of applications presented in the third interface 103 includes applications within the selected subcategory that match the user's query string.

System Architecture

Figure 2:
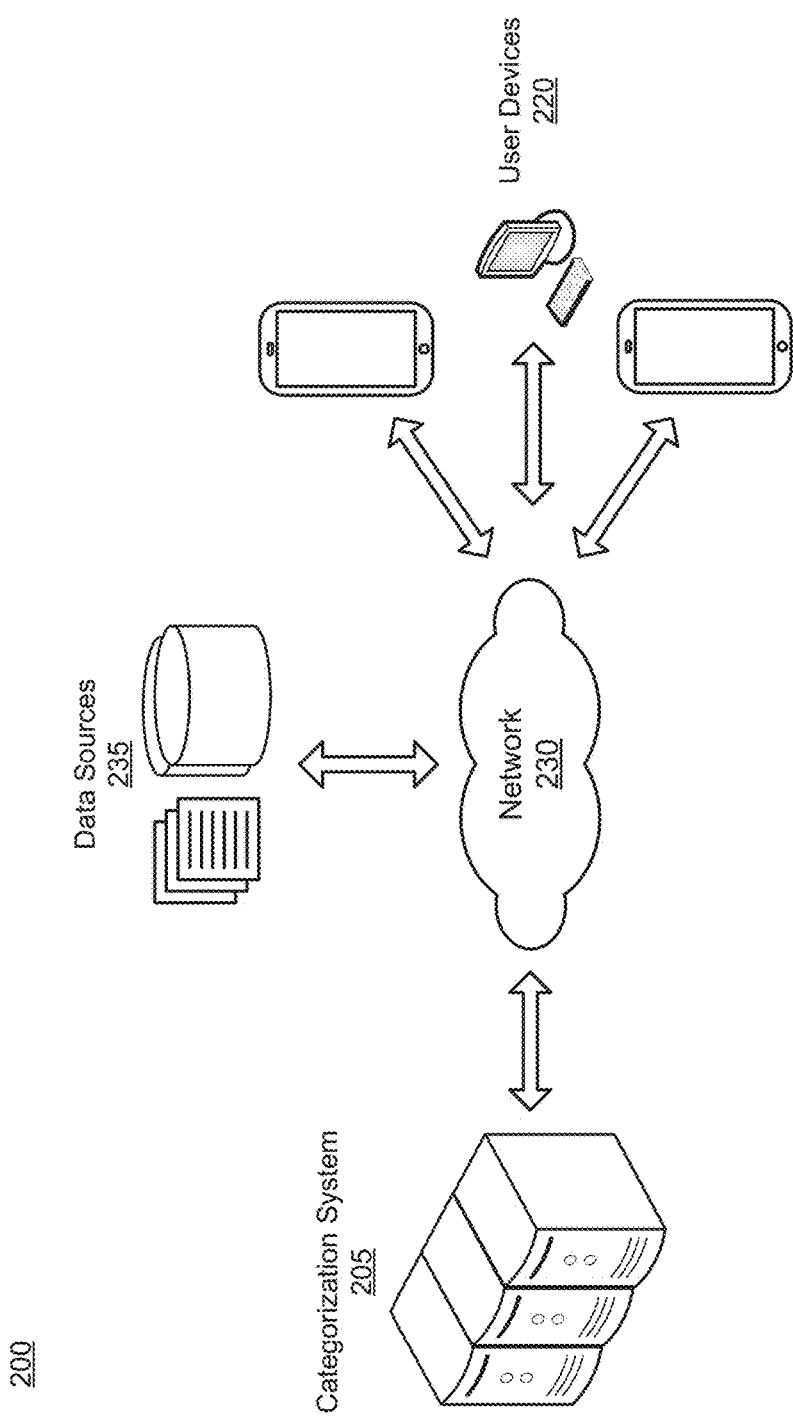
FIG. 2 illustrates an example environment for performing a function-based application search.

FIG. 2 is a high-level block diagram illustrating an environment 200 used for a wheel-based interface for browsing through applications, according to one embodiment. The environment 200 includes a network 230, one or more data sources 235, user devices 220, and a categorization system 205. The data sources 235, user devices 220, and categorization system 205 are in communication with one another via the network 230. Those of skill in the art will recognize that typical environments can have different numbers of data sources 235, user devices 220, and categorization systems 205 than illustrated in FIG. 2.

The network 230 enables communications between the various entities of the environment 200. In one embodiment, the network 230 uses standard communications technologies and/or protocols. Thus, the network 230 can include links using technologies such as Ethernet, Wireless Fidelity (WiFi) (e.g., 802.11), worldwide interoperability for microwave access (WiMAX), 3G, Long Term Evolution (LTE), digital subscriber line (DSL), asynchronous transfer mode (ATM), InfiniBand, PCI Express Advanced Switching, etc. Similarly, the networking protocols used on the network 230 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 230 can be represented using technologies and/or formats including the hypertext markup language (HTML), the extensible markup language (XML), etc. In addition, all or some of the links can be encrypted using conventional encryption technologies such as secure sockets layer (SSL), transport layer security (TLS), virtual private networks (VPNs), Internet Protocol security (IPsec), etc. In another embodiment, the entities can use custom and/or dedicated data communications technologies instead of, or in addition to, the ones described above. Depending upon the embodiment, the network 230 can also include links to other networks such as the Internet.

The data sources 235 provide data regarding one or more applications to the categorization system 205. The data sources 235 are, for example, the systems of operators of application stores, the systems of application developers, the systems of application catalogs or databases, websites (e.g., blogs, application review sites, etc.), and the like. The categorization system 205 accesses the data sources 235 according to the interface, content, and update rate of each of the data source 235.

The user devices 220 receive application data from the categorization system 205 and display the wheel-based user interface to one or more users. A user device 220 may be any suitable computer system, such as a computer server, a desktop computer, a laptop computer, a mobile device (e.g., a tablet, smartphone, personal digital assistant, or wearable computer system), a gaming device, and any other suitable computing system. The components of an example user device 220 are described with reference to FIGS. 4A and 4B.

The categorization system 205 maintains data that is used to sort applications into the categories and subcategories in the interfaces shown in FIGS. 1A-1C. An example method of implementing the categorization system 205 is described below with reference to FIGS. 3A-3C. The categorization system 205 retrieves data relating to applications from data sources 235. Using the retrieved data, the categorization system 205 identifies attributes of the applications and classifies the applications into categories and subcategories. When the categorization system 205 receives a query from a user device 220 specifying a category and a subcategory, the categorization system 205 determines applications responsive to the query to provide to the user devices 220.

Figure 3A:
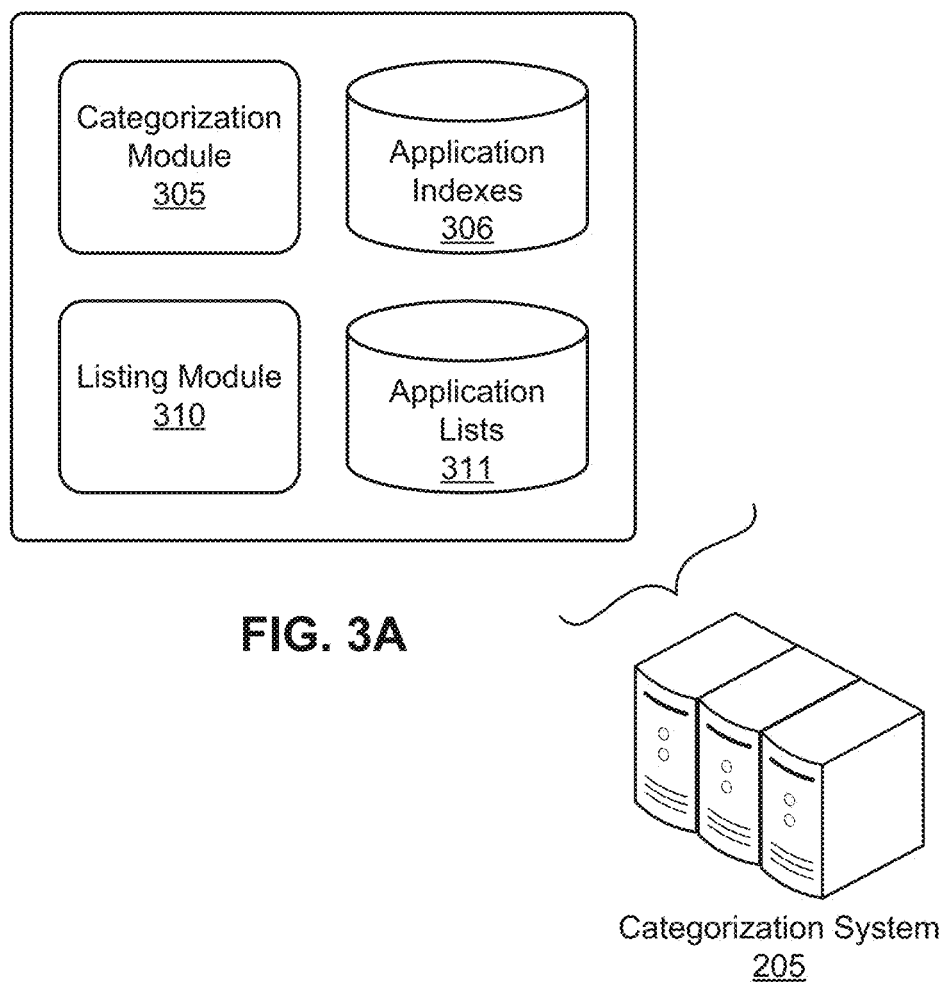
FIG. 3A is an example block diagram illustrating modules within a categorization system.

FIG. 3A is a block diagram illustrating components of the categorization system 205, according to one embodiment. In the illustrated embodiment, the categorization system 205 includes a categorization module 305, application indexes 306, a listing module 310, and application lists 311. Some embodiments of the categorization system 205 have additional, different, and/or other components than the ones described herein. In other embodiments, the functions of the categorization system 205 are distributed among multiple systems. That is, some or all of the functions of the categorization system 205 can be performed by other entities.

The categorization module 305 combines data received from the data sources 235 into application representation structures for applications. For example, the categorization module 305 receives attributes of the same application from multiple data sources 235 and adds the attributes to the application representation structure as application data items of the application. An attribute may be a particular characteristic that describes a feature of the application. For example, attributes may be icons that represent the application, screenshot images of the application in operation, an Application ID, a store ID, a developer name, a publisher name, a language, an Entertainment Software Rating Board (ESRB) rating, a date released, a size of an application, platform information, a price, a version, a short description, security ratings, user reviews, user ratings, an application category, an application subcategory, or other aspects of an application. An application category represents a group of applications having similar functionality, language, platform, subject matter, price, or some other attribute. An application subcategory represents a group of applications within a given category that have further similarities in one or more attributes. The categorization module 305 may also assign a subcategory or a category to an application if a category or subcategory for an application is not received from any of the data sources 235. In one embodiment, the missing category or subcategory is assigned automatically (e.g., using a lookup table associating categories and subcategories to other attributes of an application, such as the application's title). The missing subcategory may also be input by an administrator of the categorization system.

Based on the application representations, the categorization module 305 generates one or more application indexes 306 for supporting application search and stores the indexes 306 in a computer-readable storage device. For example, the categorization module 305 may generate the application indexes 306 by processing the attributes included in each of the application representations. Each application index 306 includes data structures populated with the application representations of the applications. In one embodiment, one or more of the indexes 306 corresponds to a category or a subcategory of applications.

Figure 3B:
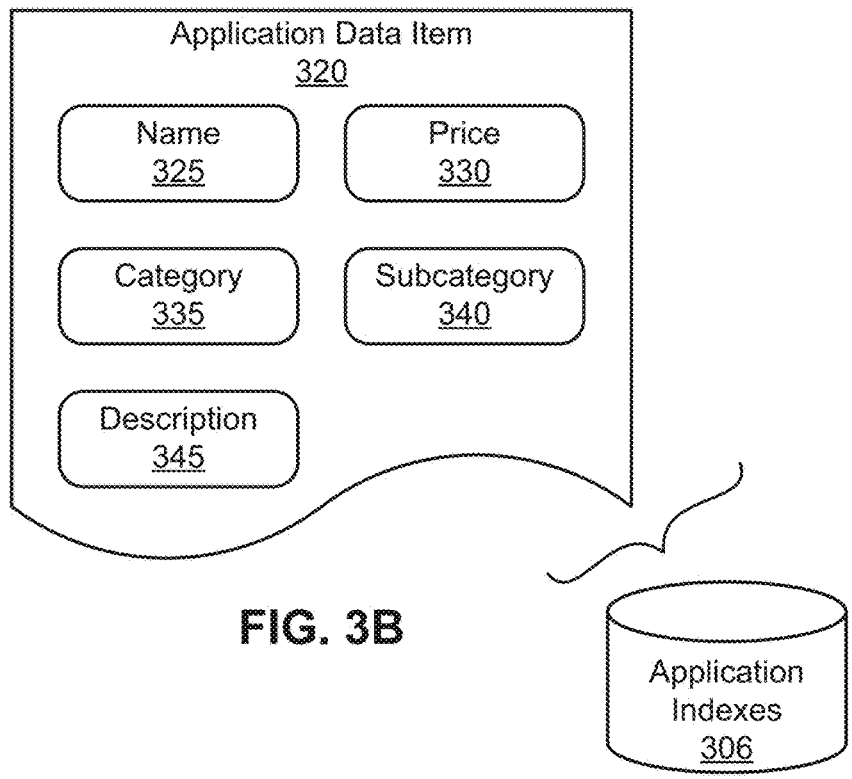
FIG. 3B is an example high-level block diagram illustrating elements of an application data item in an application index.

FIG. 3B illustrates an example data structure for an application data item 320 in the application indexes 306. In the example shown, the application data item 320 includes several attributes of the application, including a name 325 of the application, a price 330 for the application, a category 335, a subcategory 340, and a description 345 of the application. The application data item 320 may further include additional attributes that are not shown in the example of FIG. 3B, such as a developer of the application, a rating, or a version number.

Referring now back to FIG. 3A, the listing module 310 retrieves application data items 320 from the application database 306 and generates application lists 311. When retrieved by a user device 220, a list 311 is displayed to the user for the user's category and subcategory selection. This list is displayed in one embodiment in the third interface, e.g., the interface 103 shown in FIG. 1C. In one embodiment, the listing module 310 automatically generates an application list 311 for each subcategory prior to receiving a request from a user device 220. For example, the listing module 310 generates a ranking for applications in the subcategory (e.g., based on number of downloads) and selects a predetermined number of top-ranked applications to be included in the list for that subcategory. In another embodiment, an administrator of the categorization system 205 selects the applications to be listed for each subcategory, and the listing module 310 receives the selections and generates the application lists 311 using the administrator selections.

Figure 3C:
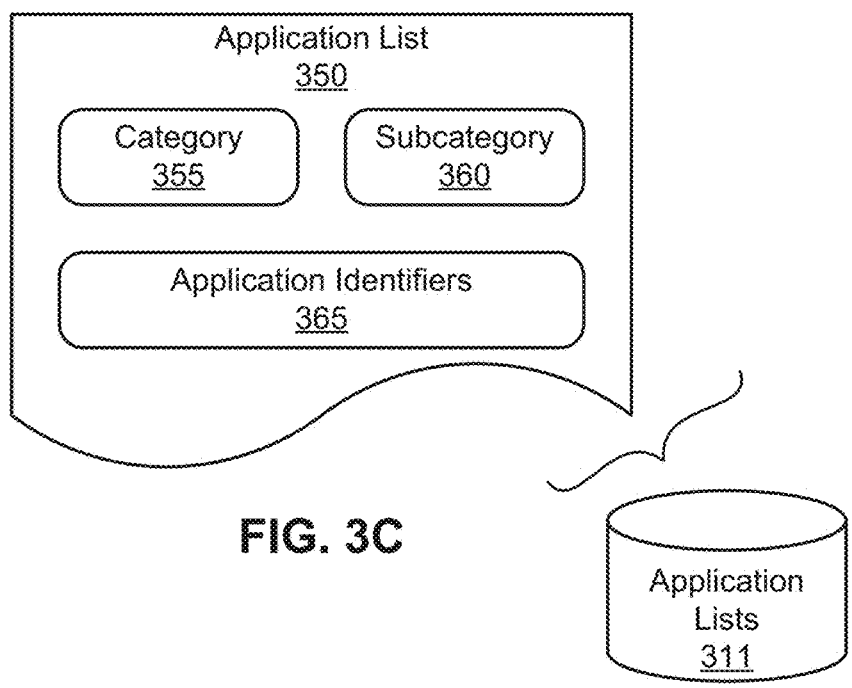
FIG. 3C is an example data structure for implementing an application list.

An example data structure for implementing an application list 350 is shown in FIG. 3C. The application list 350 includes attributes indicating the category 355 and subcategory 360 of the applications in the list, and also includes a list of identifiers 365 for the application data items 320 representing applications in the list.

FIG. 4A is an example high-level block diagram illustrating components of a user device 220, according to one embodiment. The user device 220 includes input devices 405, a display 415, and a categorization system application 425. The user device 220 may also include additional components that are common to computing devices, such as a processor for executing computer program code, a non-transitory storage medium for storing program code and data (including program code and data for the browser application), and networking hardware interfacing with the network to exchange data with the social networking system. These additional components are described in further detail with reference to FIG. 8.

The input devices 405 are hardware devices configured to receive interactions from a user. Examples of an input device 405 include a touch-sensitive surface (e.g., a touchscreen or trackpad), a mouse, a keyboard, or a microphone. The display 415 is a hardware device that provides visual output to the user. For example, the display 415 may be a display device (e.g., a liquid crystal display (LCD) screen) integrated into the client device. In one embodiment, an input device 405 and display 415 are integrated into a single touch-sensitive display component.

The user device 220 also includes a categorization system application 425 executing on the user device 220. The categorization system application 425 communicates information between the user device 220 and the categorization system 205 so that a user can access features of the categorization system 205. The categorization system application 425 includes an interface display module 430 that performs functions to display the wheel-based user interface. The categorization system application 425 also includes a data retrieval module 440 for retrieving application data from the categorization system 205, as well as a data cache 450 for storing the retrieved data.

The user device 220 may further include a browser application that receives web pages or other content from remotely-connected web-servers (e.g., the categorization system 205) and displays the web pages or other content to the user. In embodiments where the user device 220 includes a browser application, the categorization system 205 may perform some of the functions of the interface display module 430 so that the wheel-based interface may be implemented as one or more web pages provided by the categorization system 205. In these embodiments, the categorization system application 425 may be omitted from the user device 220. In this embodiment, the functions of the categorization system application are executed within the browser application, such as by an applet or script on a categorization system 205 page.

The data retrieval module 440 generates an application search query based on user inputs at the category and subcategory browse wheels. The application search query identifies the category and subcategory selected by the user. If a user enters a query string (e.g., via the search bar 107 or query menu 109), the application search query generated by the data retrieval module 440 may also include the user's query string. Similarly, if a user selects a desired price range for applications via the price selection element 130, the application search query generated by the data retrieval module 440 may include the selected price range. In one embodiment, the application search query generated by the data retrieval module 440 specifies other application attributes in addition to the category and subcategory. For example, the data retrieval module 440 may specify an operating system executing on the device 220 in the application search query so that search results for the search query include applications compatible with the operating system of the device 220. Other examples of attributes that the data retrieval module 440 may implicitly add to a query (that is, without user input at the browse wheels) include geographic location and language of the user.

The data retrieval module 440 may also generate application search queries in response to user inputs at portions of the user interfaces besides the browse wheels. For example, if a user enters a query string into the search bar 107 on the third interface or selects a predefined query string from the query menu 109 while viewing a list of applications in a particular subcategory, the data retrieval module 440 generates a query including the user's query string and the currently-selected application subcategory.

Using the application search query, the data retrieval module 440 retrieves application lists and application data items identified in the lists from the categorization system 205. In one embodiment, the data retrieval module 440 retrieves the application data items and application lists prior to receiving user interactions with the wheel-based interface, and stores the retrieved application data items and application lists in the data cache 450. By storing the application data items and application lists in the data cache 450, the data retrieval module 440 reduces latency when the wheel-based interface is used. The data retrieval module 440 may retrieve data from the categorization system application 425 and update the data cache 450 at regular intervals (e.g., every hour). Alternatively, the categorization system 205 sends the application data items and lists to the user device 220 without an accompanying request from the user device 220. For example, an application list may be pushed to the user devices 220 when the list is updated on the categorization system 205. In this case, the data retrieval module 440 receives the application data items and application lists, and stores them in the data cache 450. In another embodiment, the data retrieval module 440 retrieves a list of applications from the categorization system 205 using a search query generated in response to user interactions with the browse wheels and/or other portions of the user interfaces.

FIG. 4B is an example high-level block diagram illustrating a detailed view of modules within the interface display module 430. In the embodiment shown in FIG. 4B, the interface display module 430 includes a wheel rendering module 432, an input processing module 434, and a list rendering module 436.

The wheel rendering module 432 renders browse wheels for display on the display 415. In a first user interface for browsing applications, the wheel rendering module 432 renders a category browse wheel, such as the browse wheel 109. The category browse wheel includes one or more category regions each corresponding to a respective application category. In one embodiment, the wheel rendering module 432 labels each category region with a name and/or an icon representing the associated category. In a second user interface, the wheel rendering module 432 renders a subcategory browse wheel, such as the browse wheel 119. In one embodiment, the subcategory browse wheel is displayed as an overlay on the category browse wheel and is concentric to the category browse wheel. Furthermore, the subcategory browse wheel includes one or more subcategory regions, each corresponding to a respective application subcategory. Similar to the category browse wheel, the subcategory regions of the subcategory browse wheel may be labeled with a name and/or an icon representing the subcategory corresponding to the region. Because the subcategories displayed on the subcategory browse wheel depend on the category selected at the category browse wheel, the wheel rendering module 432 may display one of several subcategory browse wheels. Each of the subcategory browse wheels may include different numbers of subcategory regions (depending on the number of subcategories within a given application category), and the labels of the regions on each of the subcategory browse wheels may differ based on the category and associated subcategories. Finally, for a third interface, the wheel rendering module 432 renders a portion of the subcategory browse wheel for display with a list of applications.

As a user interacts with the browse wheels generated by the wheel rendering module 432, the wheel rendering module 432 updates the display based on user inputs. For example, in response to receiving a user selection of a category at the category browse wheel, the wheel rendering module 432 displays a transition animation to transition from the category browse wheel to the subcategory browse wheel. Similarly, in response to receiving a user input at the subcategory browse wheel, the wheel rendering module 432 displays a transition animation from the subcategory browse wheel to the partial browse wheel displayed on the third interface. Within an interface, the wheel rendering module 432 may render animations of the category or subcategory browse wheel, such as rotating the browse wheel in response to user inputs.

The input processing module 434 receives user inputs from the input devices 405 and processes the inputs. The input processing module 434 sends a signal to the wheel rendering module 432 to update the display based on the received user input, and sends an identifier of selected application categories and subcategories to the data retrieval module 440. To process a tapping gesture, the input processing module 434 receives coordinates indicating the location of a user's tapping gesture on the display screen. The input processing module 434 determines which category or subcategory region includes the received coordinates. To process a swiping gesture (e.g., an arc-shaped swiping gesture), the input processing module 434 receives coordinates indicating the beginning and ending positions of the user's gesture. Based on the coordinates of the beginning of the gesture, the input processing module 434 determines which category or subcategory region was selected by the user. Based on the coordinates of the end of the gesture, the input processing module 434 determines an amount to rotate the browse wheel. For example, the input processing module 434 may determine that the browse wheel is to rotate by an angular displacement substantially equal to the angular distance between the beginning and ending coordinates of the user's gesture. The input processing module 434 sends the determined angular displacement to the wheel rendering module 432, which rotates the wheel accordingly. Other inputs processed by the input processing module 434 include user interactions with the selection region in the category or subcategory browse wheels (e.g., the selection regions 115, 125 illustrated in FIGS. 1A-B), user interactions with the price selection element (e.g., the element 130 illustrated in FIG. 1B), and user interactions with a back button (e.g., the back buttons 105A and 105B illustrated in FIGS. 1A-C).

The list rendering module 436 generates an application search query based on user interactions with the subcategory browse wheel 119. Using the generated application search query, the list rendering module 436 retrieves a list of applications within the subcategory selected by the user from the categorization system 205. The list rendering module 436 renders a list of applications in a selected subcategory and displays the list on the display 415. To render the list, the list rendering module 436 may retrieve one or more attributes of each application in the list from the categorization system 205, such as a name, a thumbnail image, a rating, and a price of the application. In one embodiment, the list rendering module 436 receives the list of applications to render from the data retrieval module 440.

Process for Using Wheel-Based User Interface

Figure 5A:
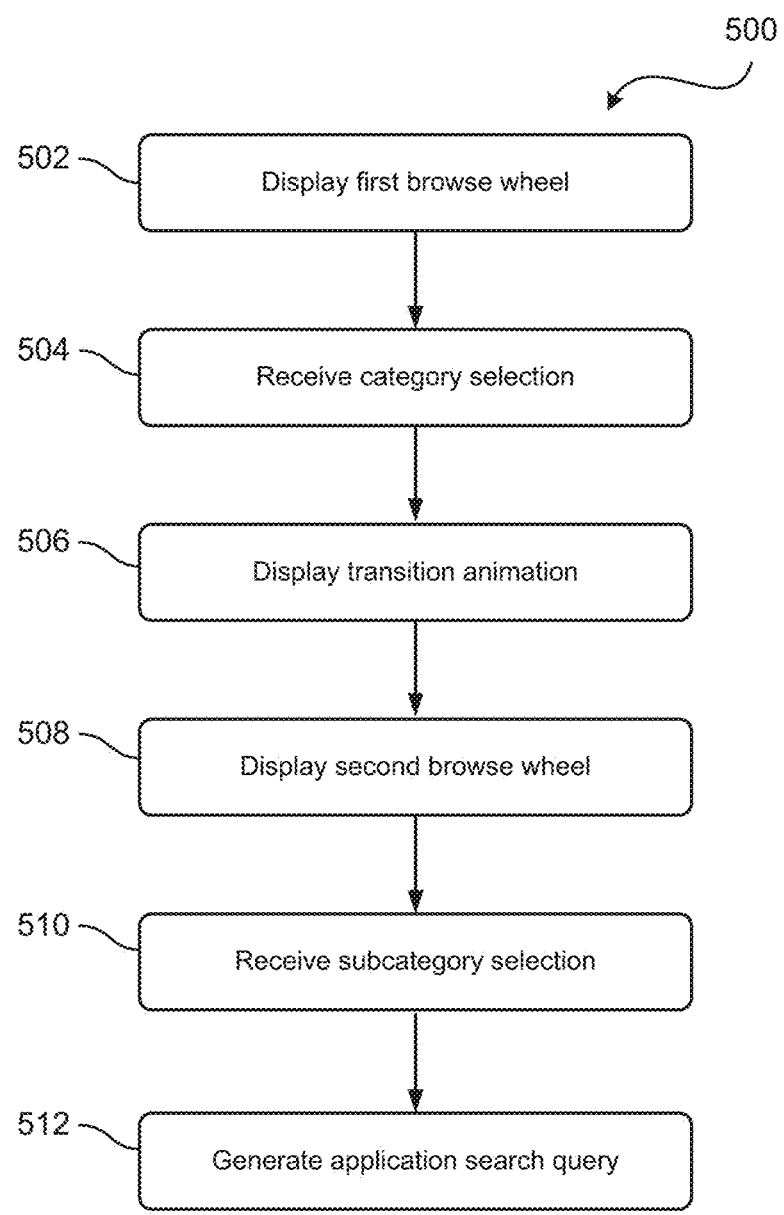
FIG. 5A is a flow chart illustrating an example method for using a wheel-based interface to navigate between categories and subcategories of applications.

FIG. 5A illustrates a method 500 for using the wheel-based interface to navigate between categories and subcategories of applications, in accordance with an embodiment. In one embodiment, the steps of the method 500 are performed by the categorization system application 425. Other embodiments can perform the steps of the method in different orders and can include different, additional, and/or fewer steps. The method 500 shown in FIG. 5A will be described with reference to the example screenshots shown in FIGS. 5B-5I.

Figure 5C:
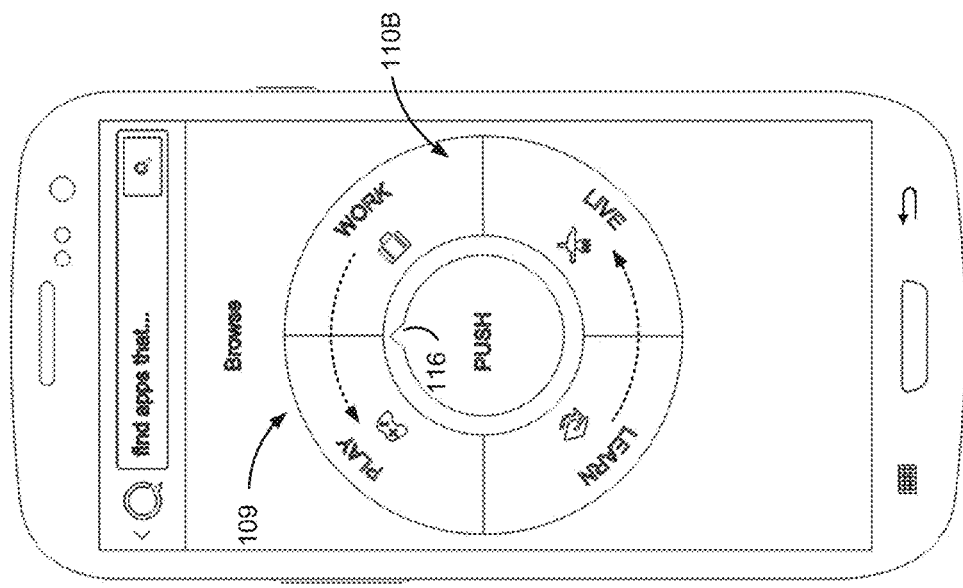
FIGS. 5B-5I show a mobile device with example screenshots of a wheel-based interface being used to navigate between categories and subcategories of applications.
Figure 5B:
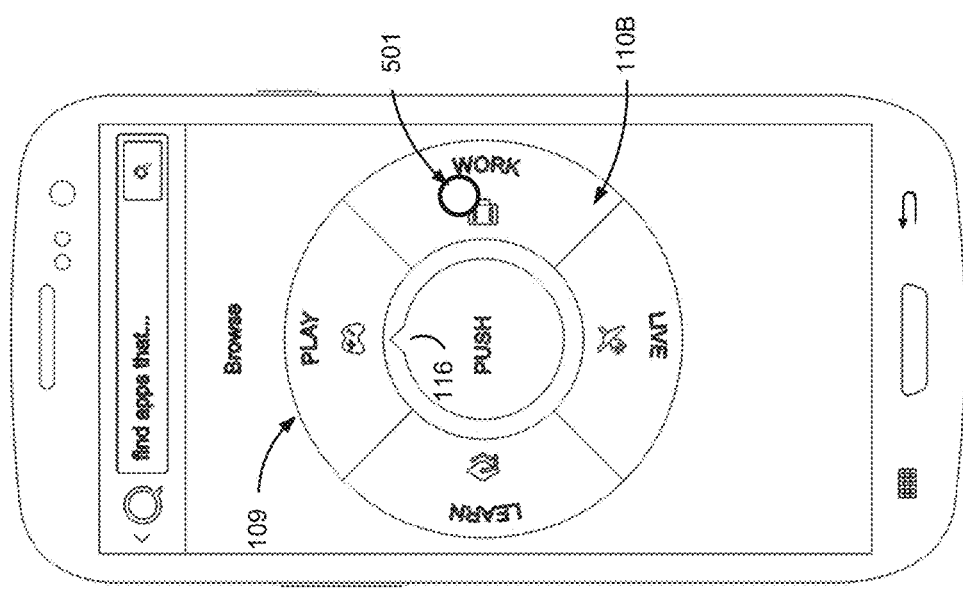

The categorization system application 425 displays 502 a category browse wheel on a touchscreen of a user device 220. As illustrated in FIG. 5B, the category browse wheel 109 has a circular shape and includes category regions ("play," "work," "live," and "learn") within the circular shape. Although FIG. 5B shows four category regions, the category browse wheel may include additional or fewer category regions. A user input, comprising a user's interaction with the category browse wheel 109, is received 504. For example, in FIG. 5B, the user input is a tapping gesture at a location 501 within the "work" category region 110B, which selects the "work" category. Other user interactions with the category browse wheel 109 may alternatively be received, such as an arc-shaped swiping gesture to rotate the category browse wheel 109 until the identifier graphic 116 identifies a desired category region.

Figure 5E:
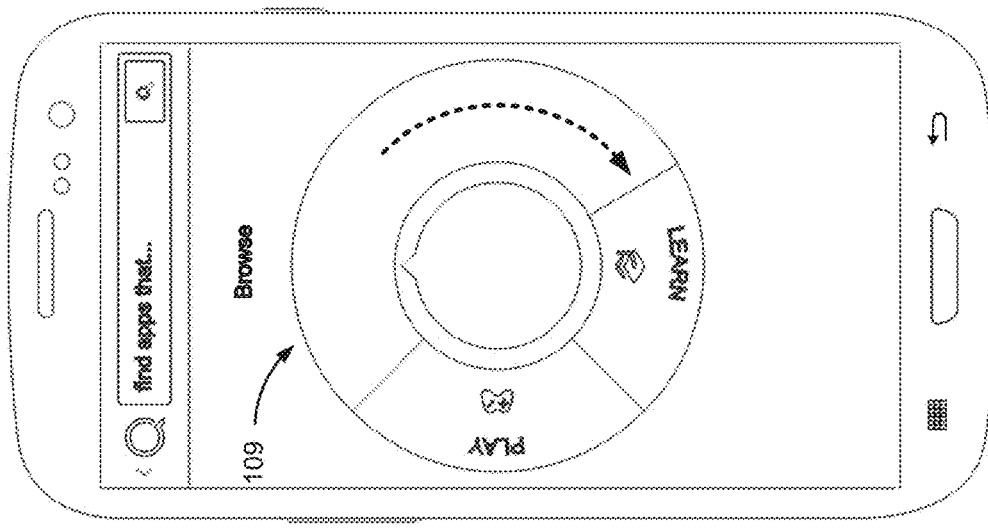
Figure 5D:
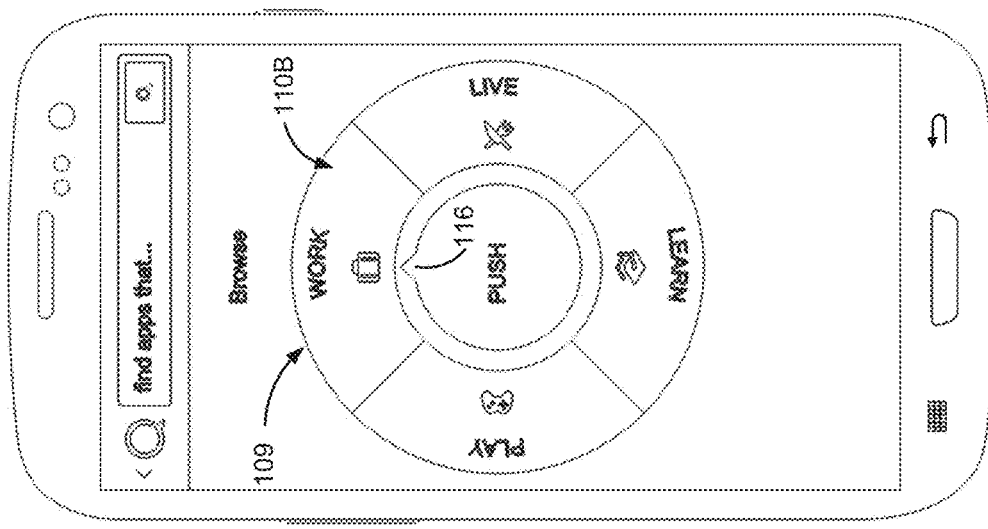
Figure 5G:
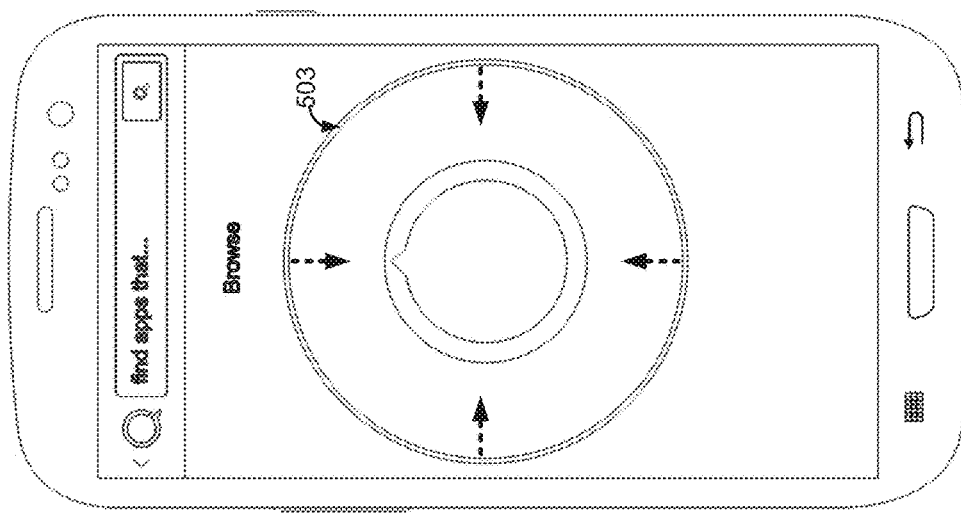
Figure 5F:
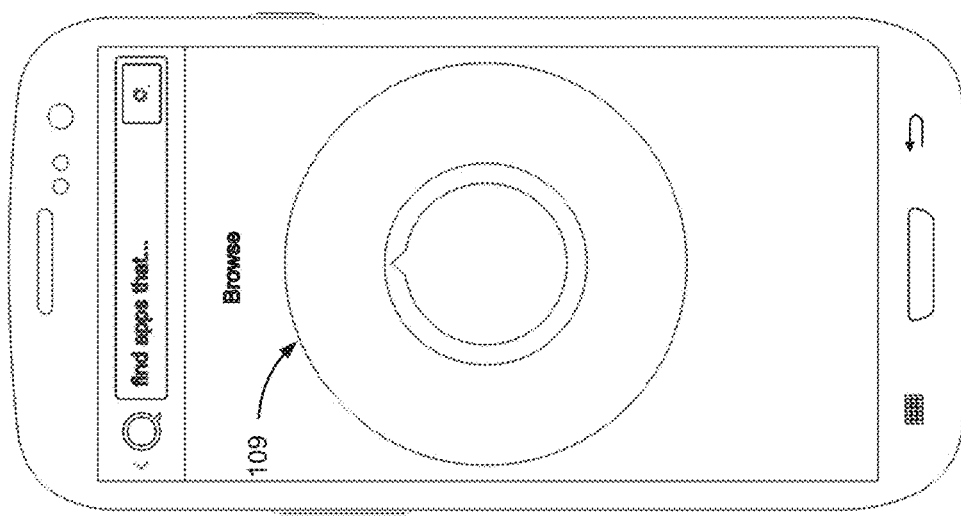
Figure 5I:
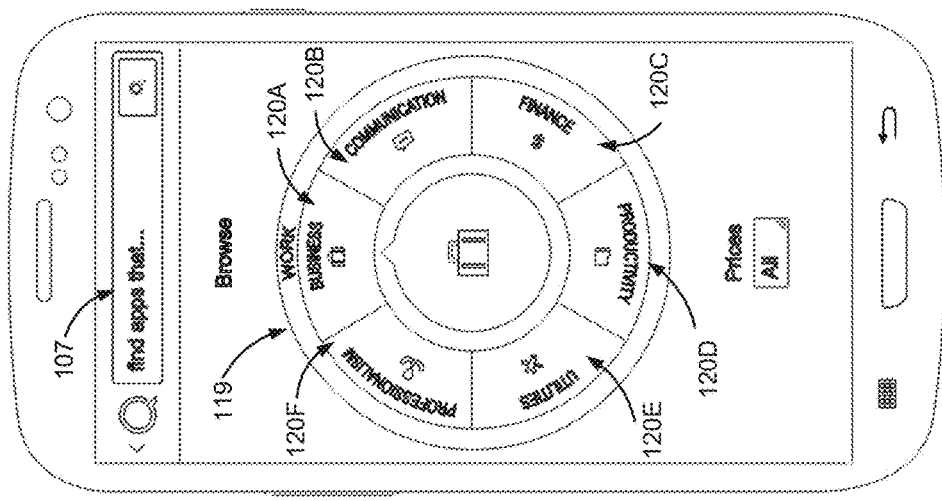
Figure 5H:
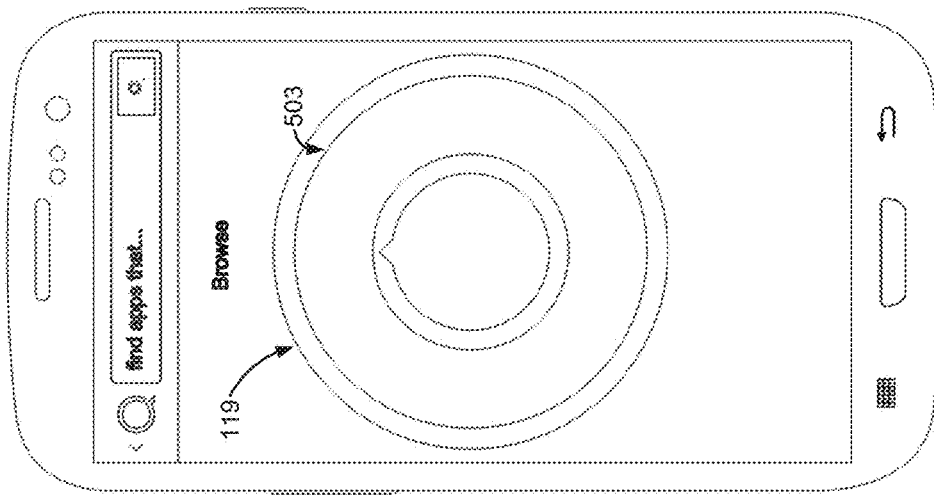

In response to receiving 504 the user input, the categorization system application 425 displays 506 a transition animation. An example transition animation is illustrated in FIGS. 5C-I. As shown in FIG. 5C, in response to receiving 504 the user input in the "work" category region 110B, the category browse wheel 109 rotates counterclockwise until the "work" category region 110B is aligned with the identifier graphic 116, as shown in FIG. 5D. Next, as shown in FIG. 5E, a circular sweep animation is displayed on the category browse wheel 109. The circular sweep animation is an animation in which the first browse wheel transitions to the second browse wheel such that the second browse wheel is shown in place of the first browse wheel on the touch-screen. In the embodiment illustrated in FIG. 5E, the circular sweep animation sequentially removes the category regions from the category browse wheel 109, until, as shown in FIG. 5F, the category regions are no longer displayed on the category browse wheel 109. In one embodiment, the circular sweep animation is a circular sweep in the opposite direction from the direction the browse wheel 109 rotated to align the selected subcategory region with the identifier graphic 116. For example, because the category browse wheel 109 rotated counterclockwise in FIG. 5C after a user input selecting the "work" category region 110B was received, the circular sweep animation shown in FIG. 5E is a clockwise sweep. After the category regions have been removed from the browse wheel, a border 503 moves radially inwards, as shown in FIGS. 5G-5H. Next, the categorization system application 425 displays 508 a subcategory browse wheel 119, as shown in FIG. 5H. The subcategory browse wheel 119 is displayed on the same area of the display in which the category browse wheel was displayed, and is displayed as a concentric overlay to the category browse wheel 109. Finally, as the last step in the transition animation shown in FIG. 5I, subcategory regions 120 are displayed on the subcategory browse wheel 119.

Various embodiments use other variations of the transition animation. For example, rather than the category browse wheel rotating counterclockwise as in FIG. 5C, the transition animation may involve a clockwise rotation of the category browse wheel 109. In one embodiment, the direction of rotation of the category browse wheel depends on the location of the selected category region on the category browse wheel 109. For example, if a selected category region is positioned substantially on the left side of the browse wheel 109 (e.g., more than half the area of the category region is on the left side), the category browse wheel rotates in a clockwise direction. If a selected category region is positioned substantially on the right side of the browse wheel 109 (e.g., if more than half of the area of the category region is on the right side), the category browse wheel rotates in a counterclockwise direction. Similarly, the circular sweep animation shown in FIG. 5E may be a counterclockwise sweep rather than a clockwise sweep.

Referring again to FIG. 5A, the categorization system application 425 receives 510 a subcategory selection, comprising a user interaction with the subcategory browse wheel. The categorization system application 425 may also receive a query string input by the user. In response to receiving the subcategory selection, the categorization system application 425 generates 512 an application search query using the selected application category and subcategory, and, if applicable, the user-entered query string.

Figure 6A:
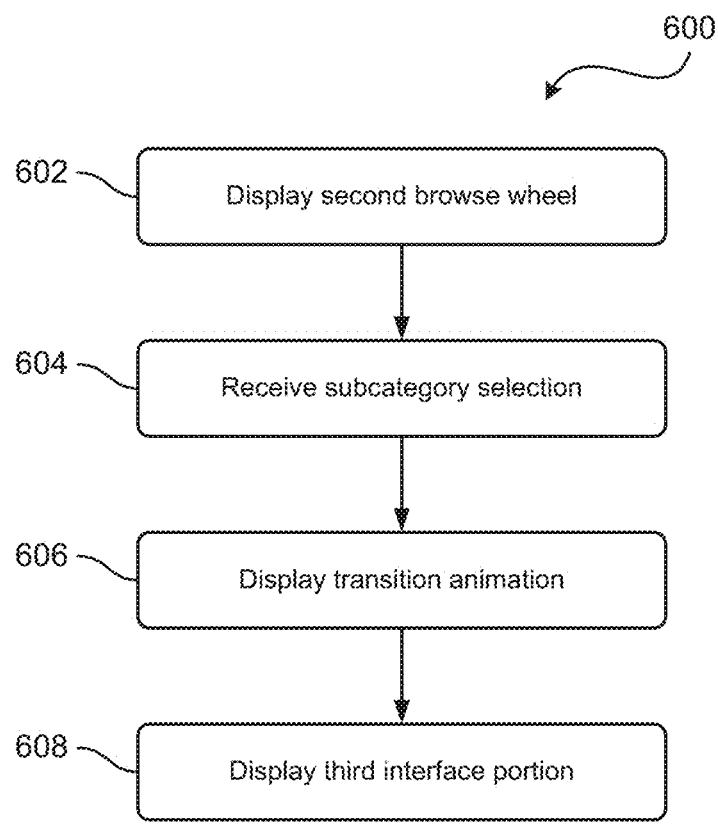
FIG. 6A is a flow chart illustrating an example method for using a wheel-based interface to navigate between subcategories of applications and lists of applications.

FIG. 6A illustrates a method 600 for using the wheel-based interface to navigate between subcategories of applications and lists of applications, in accordance with one embodiment. In one embodiment, the steps of the method 600 are performed by the categorization system application 425. Other embodiments can perform the steps of the method in different orders and can include different, additional, and/or fewer steps. The method 600 shown in FIG. 6A will be described with reference to the example screen-shots shown in FIGS. 6B-6F.

Figure 6C:
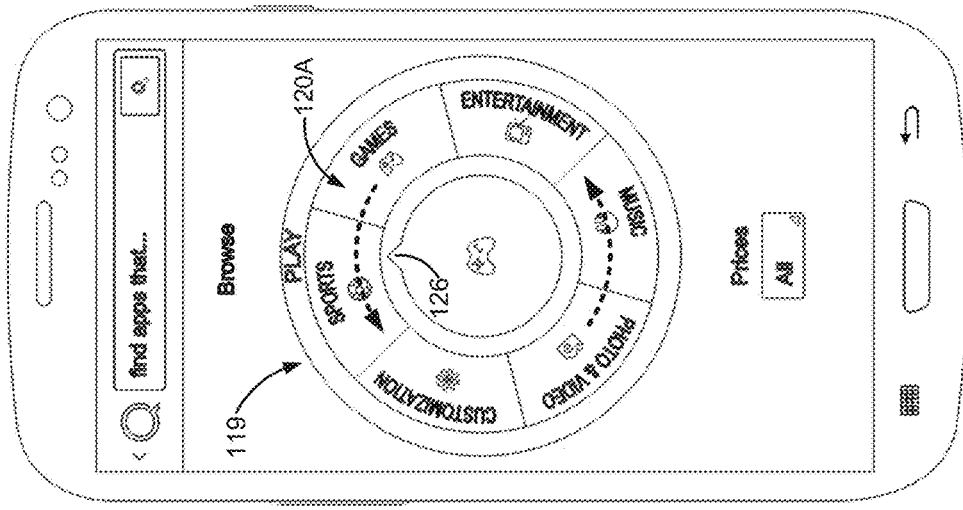
FIGS. 6B-6F show a mobile device with example screenshots of a wheel-based interface being used to navigate between subcategories of applications and lists of applications.
Figure 6B:
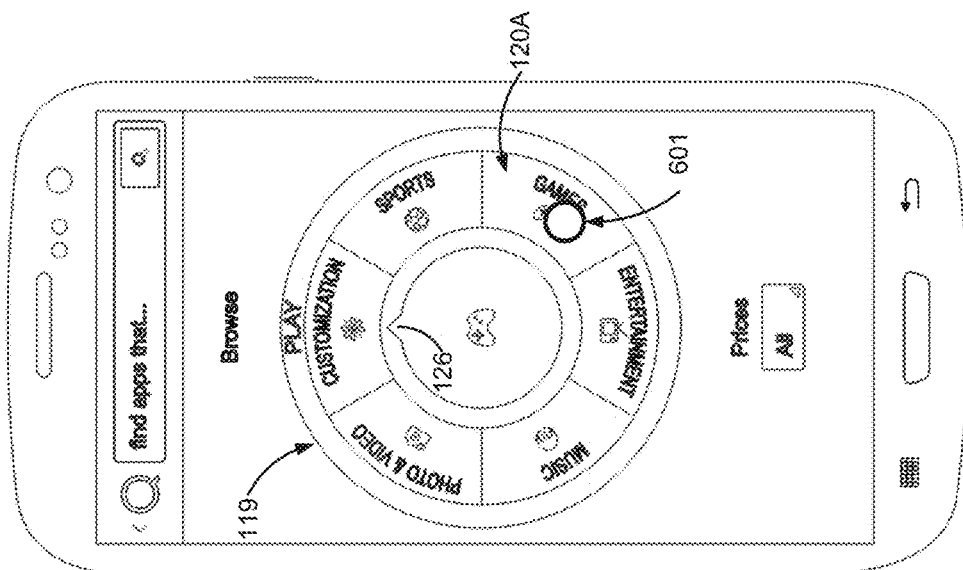

The categorization system application 425 displays 602 the subcategory browse wheel, which includes one or more subcategory regions each corresponding to a subcategory of applications. For example, the subcategory browse wheel 119 is illustrated in FIG. 6B. The subcategory regions of the subcategory browse wheel depend on the category selected by a user interacting with the category browse wheel. The categorization system application 425 receives 604 a user selection of a subcategory region of the subcategory browse wheel. Similar to user interactions with the category browse wheel, user interactions with the subcategory browse wheel may be received in several different ways. As one example, which is illustrated in FIG. 6B, a tapping gesture is received at a location 601 within the "games" subcategory region 120A. Other examples of user interactions with the subcategory browse wheel include arc-shaped swiping gestures to angularly swipe a desired subcategory region until the identifier graphic 126 identifies the desired subcategory region.

Figure 6E:
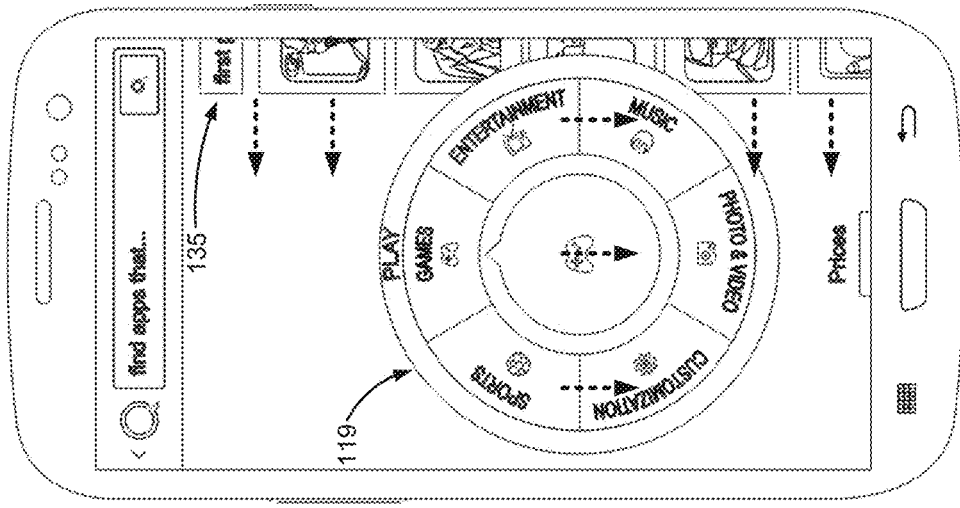
Figure 6D:
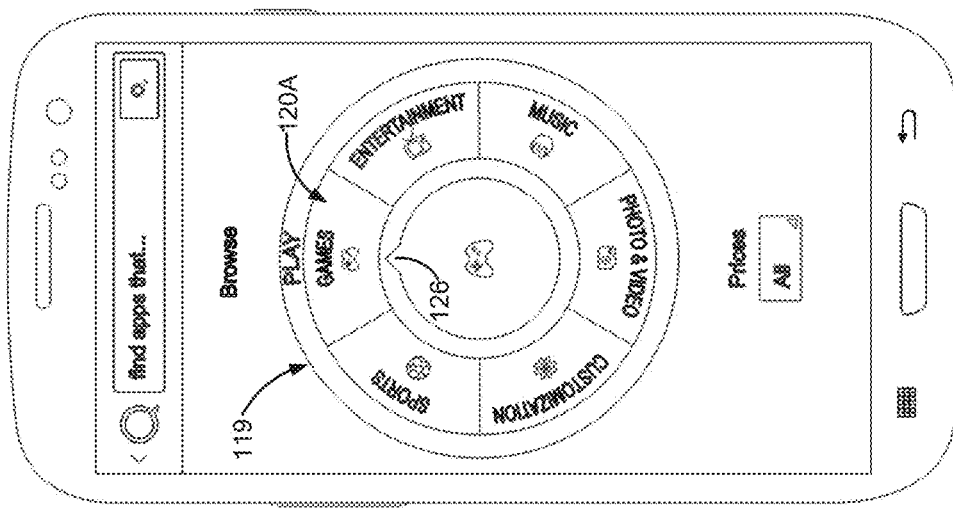
Figure 6F:
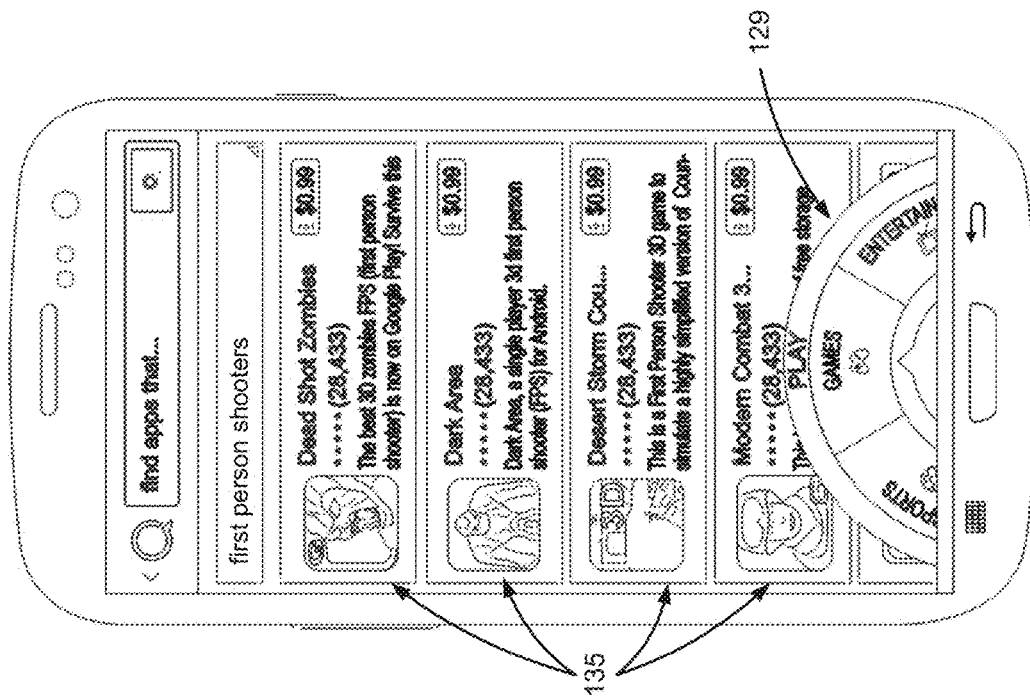

In response to receiving 604 the user input, the categorization system application 425 displays 606 a transition animation. An example transition animation is shown in FIGS. 6C-6F. As shown in FIG. 6C, the subcategory browse wheel 119 rotates counterclockwise until the "games" subcategory region 120A is aligned with the identifier graphic 126, responsive to the user selection of the "games" subcategory region received in FIG. 6B. After the "games" subcategory region 120A is aligned with the identifier graphic 126, as shown in FIG. 6D, the categorization system application 425 displays a translation of the subcategory browse wheel 119 to an edge of the display, as shown in FIG. 6E. In particular, FIG. 6E shows a downward translation of the subcategory browse wheel 119 to a bottom edge of the display, though in other embodiments the subcategory browse wheel 119 may be translated to a different edge of the display. As also shown in FIG. 6E, the categorization system application 425 displays a leftward translation of a list 135 of applications during the downward translation of the subcategory browse wheel 119. Finally, as shown in FIG. 6F, the categorization system application 425 displays 608 a third interface, which includes the list 135 of applications in the selected subcategory as well as a portion 129 of the subcategory browse wheel 119. The portion 129 of the subcategory browse wheel displayed on the third interface includes at least the subcategory region corresponding to the selected subcategory.

Figure 7A:
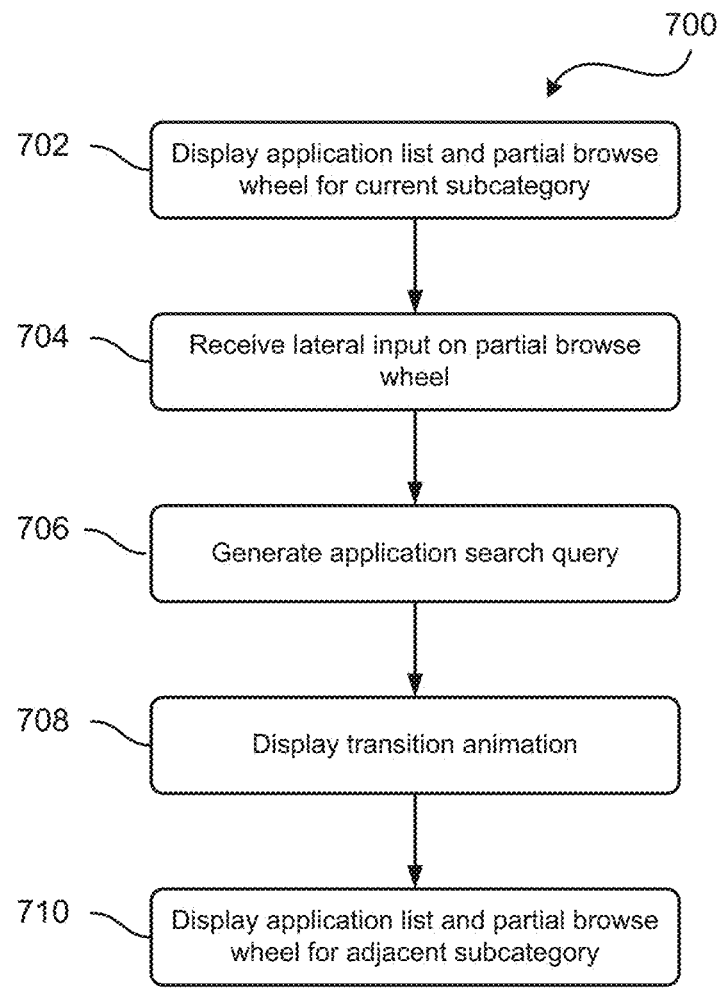
FIG. 7A is a flow chart illustrating an example method for using a wheel-based interface to navigate between lists of applications in different subcategories.

When viewing the list 135 of applications, the user can navigate to a list of applications in a second subcategory without returning to the second interface. FIG. 7A illustrates a method 700 for using a wheel-based interface to navigate between lists of applications in different subcategories, in accordance with an embodiment. In one embodiment, the steps of the method 700 are performed by the categorization system application 425. Other embodiments can perform the steps of the method in different orders and can include different, additional, and/or fewer steps. The method 700 shown in FIG. 7A will be described with reference to the example screenshots shown in FIGS. 7B-7D.

Figure 7C:
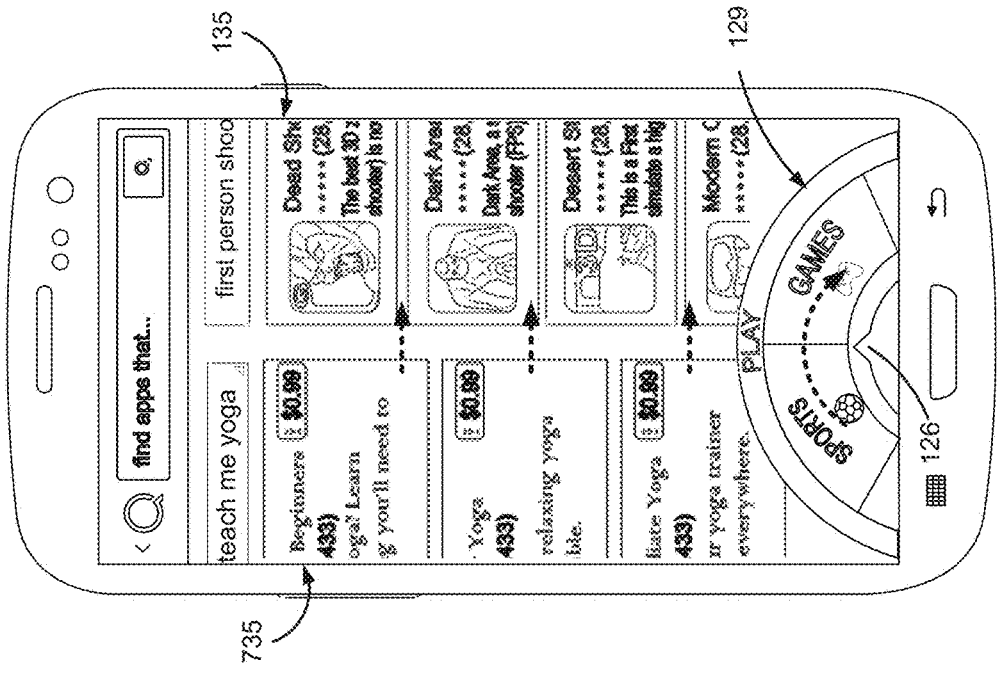
FIGS. 7B-7D show a mobile device with example screenshots of a wheel-based interface being used to navigate between lists of applications in different subcategories.
Figure 7B:
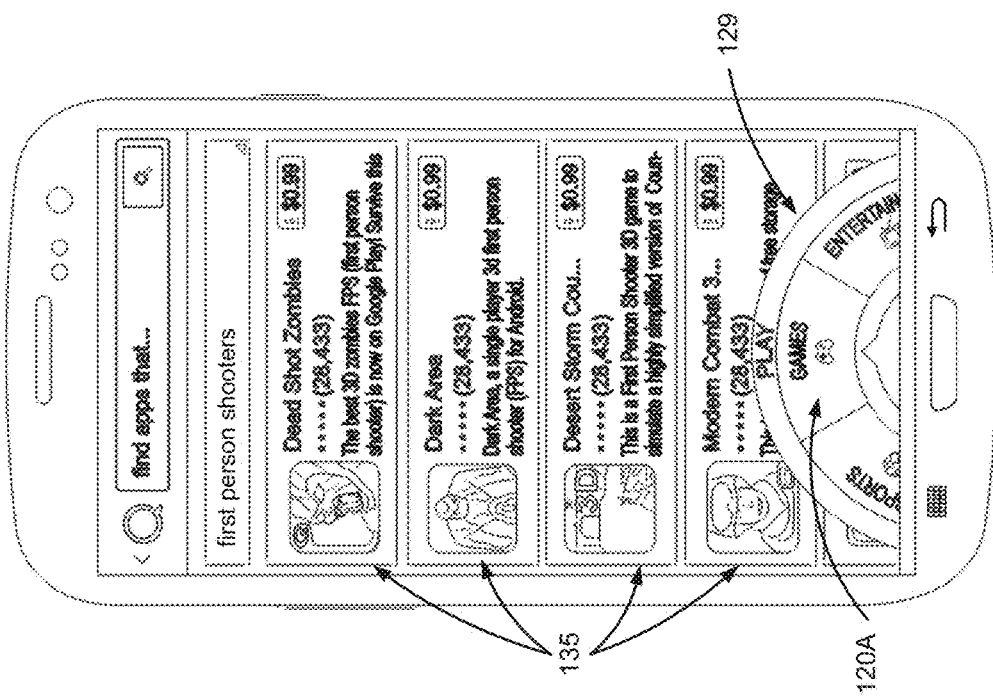

The categorization system application 425 displays 702 a list of applications in a first subcategory and a portion of the subcategory browse wheel, including at least the subcategory region corresponding to the first subcategory. For example, FIG. 7B illustrates a list 135 of applications with the "games" subcategory, and illustrates a portion 129 of the subcategory browse wheel including the subcategory region 120A corresponding to the "games" subcategory. The categorization system application 425 receives 704 a user input at the displayed portion of the subcategory browse wheel. The received user input selects a second subcategory region in the subcategory browse wheel. For example, the received user input is a lateral or arc-shaped gesture to rotate the subcategory browse wheel until a second subcategory region is aligned with an identifier graphic. An example user gesture is illustrated in FIG. 7C. In FIG. 7C, the user provides an input at the portion 129 of the subcategory browse wheel to rotate the wheel in a clockwise direction until the "sports" subcategory region is aligned with the identifier graphic 126.

In response to receiving 704 the user input, the categorization system application 425 generates 706 an application search query using the second subcategory region. The categorization system application 425 uses the search query to retrieve a list of applications within the second subcategory. The list of applications may be retrieved from the user device 220 or from the categorization system 205.

Figure 7D:
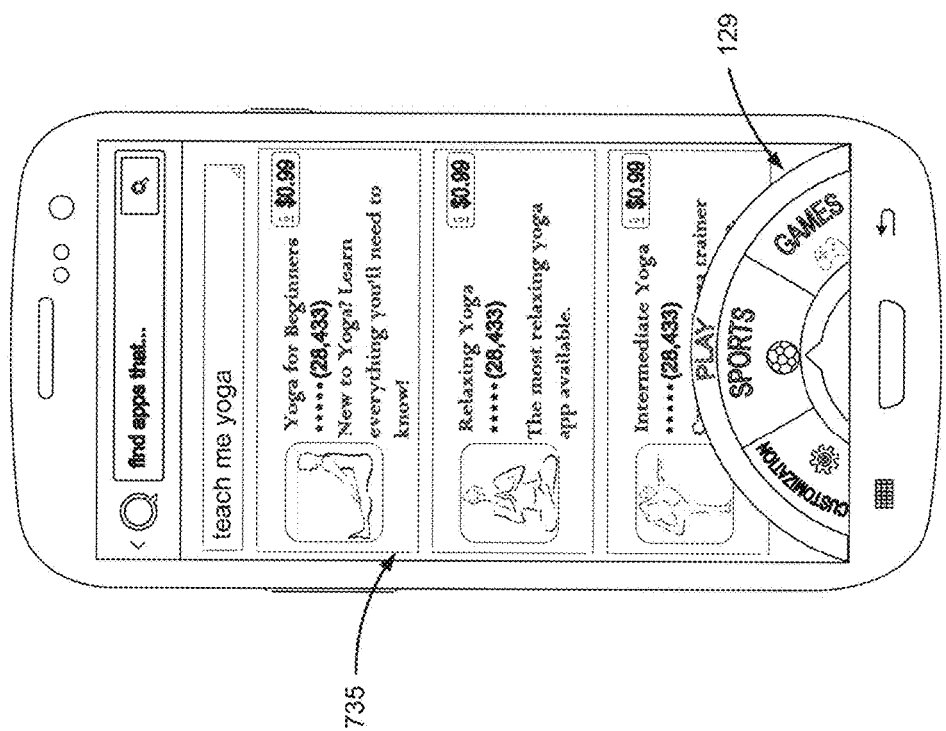

The categorization system application 425 displays 708 a transition animation to transition from the list of applications in the first subcategory to the list of applications in the second subcategory. For example, the categorization system application 425 displays a horizontal translation of the list 135 and a horizontal translation of a list 735 of applications in the second subcategory. In one embodiment, to provide an intuitive user interface, the direction of the horizontal translation depends on the direction of rotation of the subcategory browse wheel. For example, because the subcategory browse wheel in FIG. 7C is rotated in a clockwise direction, the lists 135, 735 are translated to the right of the display. Alternatively, if a user input to rotate the subcategory browse wheel in a counterclockwise direction is received, the lists 735, 135 may be translated to the left of the display. The list of applications in the second subcategory, such as the second application list 735, is displayed 710 by the categorization system application 425. FIG. 7D illustrates the second application list 735, along with the portion 129 of the subcategory browse wheel including the "sports" subcategory. The user can interact with the list 735 of applications in the second subcategory to select a desired application, or can rotate the subcategory browse wheel to select yet another subcategory of applications to browse.

The wheel-based user interface described herein has multiple advantages. In particular, since applications are categorized into both categories and subcategories, the user can initially be presented with a relatively small number of top-level categories (e.g., four). Presenting applications in this manner prevents overwhelming the user with a long list of narrowly-defined categories in which it may be difficult for the user to quickly find a desired category. In addition, the layout of the browse wheel and indicator graphic resembles physical objects such as control knobs and combination locks, which makes the interface intuitive to the user and easier to manipulate than a conventional list of categories.

While the wheel-based user interface has been described as a circular wheel, the "wheel" may be any suitable shape that rotates about a point and can be turned by the user. For example, the user interface may be any suitable shape that can be easily rotated by the user, such as a square, star, hexagon, or other shape, and does not need to be a symmetric shape. The category browse wheel 109 and subcategory browse wheel 119 may also be different shapes, and the subcategory browse wheel 119 may not be concentric to the category browse wheel. A wheel-based user interface may also include more than two browse wheels for browsing any number of levels of a hierarchy.

Furthermore, while the wheel-based user interface has been described as providing a method for browsing categories and subcategories of applications, the interface may be used to browse any type of hierarchically organized objects or data. For example, a wheel-based interface could be used to browse categories and subcategories of music, videos, books, photos, job postings, classified ads, restaurant listings, and the like. Similarly, the wheel-based interface is not limited to browsing objects of a single type. For example, the category browse wheel may be used to select an object type (e.g., applications, music, videos, and so forth), while the subcategory wheel is used to select categories within the selected object type.

Computing Machine Architecture

Figure 8:
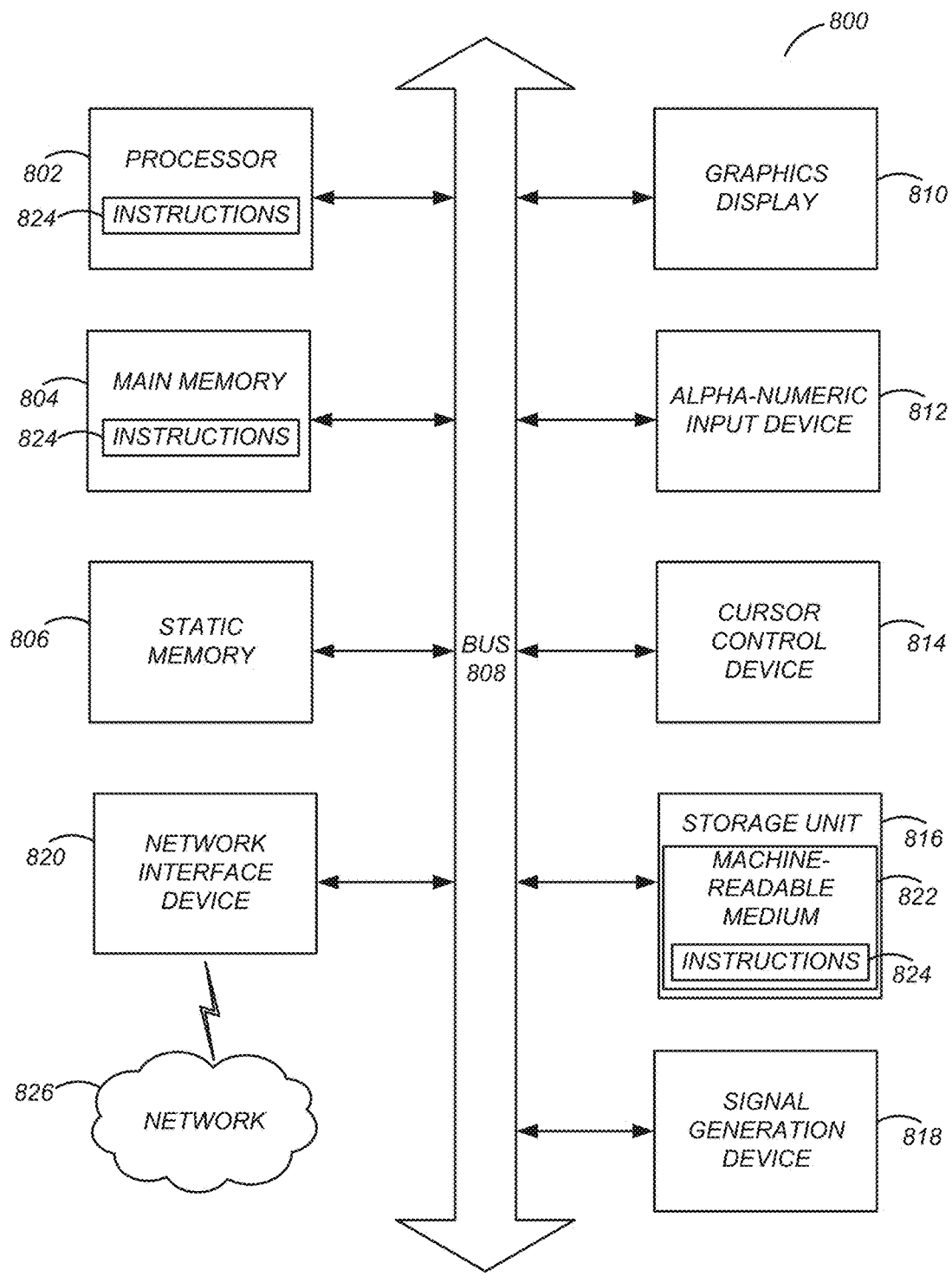
FIG. 8 illustrates components of an example machine able to read instructions from a machine-readable medium and execute the instructions in a processor (or controller).

FIG. 8 is a block diagram illustrating components of an example machine able to read instructions from a machine-readable medium and execute them in a processor (or controller), as an example of the categorization system 205 or user devices 220. Specifically, FIG. 8 shows a diagrammatic representation of a machine in the example form of a computer system 800 within which instructions 824 (e.g., software) for causing the machine to perform any one or more of the methodologies discussed herein may be executed. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 824 (sequential or otherwise) that specify actions to be taken by that machine. Further, while only a single machine is illustrated, the term "machine" shall also be taken to include any collection of machines that individually or jointly execute instructions 824 to perform any one or more of the methodologies discussed herein.

The example computer system 800 includes one or more processors 802 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 804, and a static memory 806, which are configured to communicate with each other via a bus 808. The computer system 800 may further include graphics display unit 810 (e.g., a plasma display panel (PDP), a liquid crystal display (LCD), a projector, or a cathode ray tube (CRT)). The computer system 800 may also include alphanumeric input device 812 (e.g., a keyboard), a cursor control device 814 (e.g., a mouse, a trackball, a joystick, a motion sensor, or other pointing instrument), a storage unit 816, a signal generation device 818 (e.g., a speaker), and a network interface device 820, which also are configured to communicate via the bus 808.

The storage unit 816 includes a machine-readable medium 822 on which is stored instructions 824 (e.g., software) embodying any one or more of the methodologies or functions described herein. The instructions 824 (e.g., software) may also reside, completely or at least partially, within the main memory 804 or within the processor 802 (e.g., within a processor's cache memory) during execution thereof by the computer system 800, the main memory 804 and the processor 802 also constituting machine-readable media. The instructions 824 (e.g., software) may be transmitted or received over a network 826 via the network interface device 820.

While machine-readable medium 822 is shown in an example embodiment to be a single medium, the term "machine-readable medium" should be taken to include a single medium or multiple media (e.g., a centralized or distributed database, or associated caches and servers) able to store instructions (e.g., instructions 824). The term "machine-readable medium" shall also be taken to include any medium that is capable of storing instructions (e.g., instructions 824) for execution by the machine and that cause the machine to perform any one or more of the methodologies disclosed herein. The term "machine-readable medium" includes, but not be limited to, data repositories in the form of solid-state memories, optical media, and magnetic media.

Additional Configuration Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms, for example, as illustrated in FIGS. 2-4B. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors, e.g., processor 802) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA), an application-specific integrated circuit (ASIC), or a system on a chip (SoC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors, e.g., processor 802, that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for using a wheel-based interface to navigate between categories and subcategories of applications through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A computer-implemented method comprising:
   displaying, on a touchscreen of a user device, a first browse wheel having a circular shape and comprising a plurality of category regions within the first browse wheel, each category region associated with an application category and having a visual representation of the associated application category;
   receiving a user selection of an application category, the user selection of the application category comprising a touchscreen interaction with the first browse wheel;
   displaying, in response to the received user selection, a second browse wheel having a circular shape and comprising a plurality of subcategory regions within the second browse wheel, each subcategory region associated with an application subcategory of the selected application category and including a visual representation of the associated application subcategory, wherein a center of the second browse wheel is at a first location of the touchscreen;
   receiving a user selection of an application subcategory, the user selection of the application subcategory comprising a touchscreen interaction with the second browse wheel;
   generating, in response to the received user selection of the application subcategory, an application search query using the selected application category and the selected application subcategory; and
   in response to receiving search results corresponding to the application search query, displaying a search results interface, wherein displaying the search results interface includes:
      displaying the search results, wherein the search results include a set of applications; and
      displaying only a portion of the second browse wheel, wherein the portion of the second browse wheel (i) is centered at a second location of the touchscreen that is different than the first location, (ii) is less than an entirety of the second browse wheel, (iii) includes at least the subcategory region associated with the selected application subcategory, and (iv) is adjoining an edge of the touchscreen of the user device.

2. The method of claim 1, wherein the first browse wheel comprises a first selection region having an identifier graphic identifying one of the plurality of category regions.

3. The method of claim 2, wherein the first selection region has a substantially circular shape and is concentric to the first browse wheel.

4. The method of claim 2, wherein receiving the user selection of an application category comprises:
   detecting a swiping gesture beginning at a first angular position inside the first browse wheel and ending at a second angular position inside the first browse wheel, the second angular position different from the first angular position;
   responsive to detecting the swiping gesture, displaying an angular rotation of the first browse wheel, the angular rotation causing the first browse wheel and the category regions to rotate such that the identifier graphic identifies a different category region;
   detecting a tapping gesture at a position inside the first selection region; and
   responsive to detecting the tapping gesture, selecting the category region identified by the identifier graphic after the angular rotation is displayed.

5. The method of claim 1, wherein receiving the user selection of an application category comprises:
   detecting a tapping gesture at a position inside a category region; and
   selecting the application category associated with the category region in which the tapping gesture was detected.

6. The method of claim 1, further comprising:
   responsive to receiving the user selection of an application category, displaying an animation over the first browse wheel.

7. The method of claim 1, wherein displaying the set of applications further comprises
   displaying a list of the applications associated with the selected application subcategory.

8. The method of claim 7, further comprising:
   responsive to receiving the user selection, displaying:
      a downward translation of the second browse wheel causing the second browse wheel to move towards the edge of the touchscreen such that only the portion of the second browse wheel is displayed, and an animation that introduces the list of the applications on the touchscreen,
wherein the edge of the touchscreen is a bottom edge of the touchscreen.

9. The method of claim 8, further comprising:
receiving a user selection of a second application subcategory, the user selection comprising a touchscreen interaction with the displayed portion of the second browse wheel; and
displaying a list of applications associated with the second application subcategory and further including a modified portion of the second browse wheel, the modified portion of the second browse wheel containing the second subcategory region.

10. The method of claim 9, wherein the user selection of the second application subcategory comprises a lateral swiping gesture on the displayed portion of the second browse wheel.

11. The method of claim 9, further comprising:
responsive to receiving the user selection, displaying an angular rotation of the second browse wheel portion, the angular rotation causing the displayed portion of the second browse wheel to contain the subcategory region associated with the second application subcategory.

12. The method of claim 1, further comprising displaying a price selection element presenting the user with a plurality of price ranges.

13. The method of claim 12, further comprising:
receiving a user selection of a price range, the user selection comprising a touchscreen interaction with the price selection element;
wherein generating the application search query comprises generating the application search query using the selected price range.

14. The method of claim 1, further comprising:
displaying a search bar configured to receive a query string;
receiving a query string at the search bar;
wherein generating the application search query comprises generating the application search query using the received query string.

15. A non-transitory computer readable medium storing instructions, the instructions when executed by a processor causing the processor to:
display, on a touchscreen of a user device, a first browse wheel having a circular shape and comprising a plurality of category regions within the first browse wheel, each category region associated with an application category and having a visual representation of the associated application category;
receive a user selection of an application category, the user selection of the application category comprising a touchscreen interaction with the first browse wheel;
display, in response to the received user selection, a second browse wheel having a circular shape and comprising a plurality of subcategory regions within the second browse wheel, each subcategory region associated with an application subcategory of the selected application category and including a visual representation of the associated application subcategory, wherein a center of the second browse wheel is at location of the touchscreen;
receive a user selection of an application subcategory, the user selection of the application subcategory comprising a touchscreen interaction with the second browse wheel;
generate, in response to the received user selection of the application subcategory, an application search query using the selected application category and the selected application subcategory; and
in response to receiving search results corresponding to the application search query, display a search results interface, wherein the search results interface includes:
a set of applications specified by the search results; and
only a portion of the second browse wheel, wherein the portion of the second browse wheel (i) is centered at a second location of the touchscreen that is different than the first location, (ii) is less than an entirety of the second browse wheel, (iii) includes at least the subcategory region associated with the selected application subcategory, and (iv) is adjoining an edge of the touchscreen of the user device.

16. The non-transitory computer readable medium of claim 15, wherein the first browse wheel comprises a first selection region having an identifier graphic identifying one of the plurality of category regions, and wherein the instructions that when executed cause the processor to receive the user selection of an application category comprise instructions that cause the processor to:
detect a swiping gesture beginning at a first angular position inside the first browse wheel and ending at a second angular position inside the first browse wheel, the second angular position different from the first angular position;
responsive to detecting the swiping gesture, display an angular rotation of the first browse wheel, the angular rotation causing the first browse wheel and the category regions to rotate such that the identifier graphic identifies a different category region;
detect a tapping gesture at a position inside the first selection region; and
responsive to detecting the tapping gesture, select the category region identified by the identifier graphic after the angular rotation is displayed.

17. The non-transitory computer readable medium of claim 15, wherein the instructions that when executed cause the processor to receive the user selection of an application category comprise instructions that cause the processor to:
detect a tapping gesture at a position inside a category region; and
select the application category associated with the category region in which the tapping gesture was detected.

18. The non-transitory computer readable medium of claim 15, wherein the set of applications is a list of the applications associated with the selected application subcategory.

19. The non-transitory computer readable medium of claim 17, further comprising instructions that when executed cause the processor to:
receive a user selection of a second application subcategory, the user selection comprising a touchscreen interaction with the displayed portion of the second browse wheel; and
display a list of applications associated with the second application subcategory and further including a modified portion of the second browse wheel, the modified portion of the second browse wheel containing the second subcategory region.

20. The non-transitory computer readable medium of claim 19, further comprising instructions that when executed cause the processor to:
responsive to receiving the user selection, display an angular rotation of the second browse wheel portion, the angular rotation causing the displayed portion of the second browse wheel to contain the subcategory region associated with the second application subcategory.

21. The non-transitory computer readable medium of claim 15, further comprising instructions that when executed cause the processor to:
   display a price selection element presenting the user with a plurality of price ranges; and
   receiving a user selection of a price range, the user selection comprising a touchscreen interaction with the price selection element;
   wherein generating the application search query comprises generating the application search query using the selected price range.

22. The method of claim 1 wherein displaying the first browse wheel includes displaying an entirety of the first browse wheel.

23. The method of claim 1 wherein displaying the search results interface includes displaying a portion of the first browse wheel, wherein the portion of the first browse wheel (i) indicates the selected application category, (ii) is less than an entirety of the first browse wheel, and (iii) adjoins the edge of the touchscreen.

24. The method of claim 1 wherein generating the application search query includes transmitting the application search query to a server and receiving the search results corresponding to the application search query.

* * * * *